(12) United States Patent
Wang et al.

(10) Patent No.: US 10,162,886 B2
(45) Date of Patent: Dec. 25, 2018

(54) EMBEDDING-BASED PARSING OF SEARCH QUERIES ON ONLINE SOCIAL NETWORKS

(71) Applicant: Facebook, Inc., Menlo Park, CA (US)

(72) Inventors: Haixun Wang, Palo Alto, CA (US); Bo Zeng, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 192 days.

(21) Appl. No.: 15/365,789

(22) Filed: Nov. 30, 2016

(65) Prior Publication Data

US 2018/0150551 A1 May 31, 2018

(51) Int. Cl.
 *G06F 17/30* (2006.01)

(52) U.S. Cl.
 CPC .. *G06F 17/30675* (2013.01); *G06F 17/30696* (2013.01)

(58) Field of Classification Search
 CPC ............... G06F 17/30696; G06F 17/30675
 USPC ......................................................... 707/723
 See application file for complete search history.

(56) References Cited

U.S. PATENT DOCUMENTS

| | | | |
|---|---|---|---|
| 5,918,014 A | 6/1999 | Robinson |
| 6,539,232 B2 | 3/2003 | Hendrey |
| 6,957,184 B2 | 10/2005 | Schmid |
| 7,069,308 B2 | 6/2006 | Abrams |
| 7,379,811 B2 | 5/2008 | Rasmussen |
| 7,539,697 B1 | 5/2009 | Akella |
| 7,752,326 B2 | 7/2010 | Smit |
| 7,783,630 B1 | 8/2010 | Chevalier |
| 7,797,635 B1 | 9/2010 | Denise |
| 7,836,044 B2 | 11/2010 | Kamvar |
| 7,840,589 B1 | 11/2010 | Holt |
| 8,024,328 B2 | 9/2011 | Dolin |
| 8,027,990 B1 | 9/2011 | Mysen |
| 8,055,673 B2 | 11/2011 | Churchill |
| 8,060,639 B2 | 11/2011 | Smit |
| 8,082,278 B2 | 12/2011 | Agrawal |
| 8,112,529 B2 | 2/2012 | Van Den Oord |
| 8,135,721 B2 | 3/2012 | Joshi |

(Continued)

OTHER PUBLICATIONS

Wang, Daixin, et al., "Structural Deep Network Embedding", KDD '16, San Francisco, CA, Aug. 13-17, 2016, pp. 1225-1234.*

(Continued)

*Primary Examiner* — Robert Stevens
(74) *Attorney, Agent, or Firm* — Baker Botts L.L.P.

(57) ABSTRACT

In one embodiment, a method includes receiving a query including multiple n-grams; parsing the query to identify a subset of n-grams; generating, for each identified n-gram, an embedding of the n-gram; determining, for each identified n-gram, one or more word senses; calculating, for each word sense for each identified n-gram, a relatedness-score for the word sense based similarity metrics of the embedding of the word sense and the embeddings of each of the other word senses corresponding to the other identified n-grams; selecting, for each identified n-gram, one of the word senses determined for the identified n-gram having a highest relatedness-score; identifying objects matching at least a portion of the query; ranking each identified object based on a quality of matching of the object to selected word senses; and sending search results corresponding to one or more of the identified objects and having a rank greater than a threshold rank.

20 Claims, 11 Drawing Sheets

(56) References Cited

U.S. PATENT DOCUMENTS

| | | |
|---|---|---|
| 8,145,636 B1 | 3/2012 | Jeh |
| 8,180,804 B1 | 5/2012 | Narayanan |
| 8,185,558 B1 | 5/2012 | Narayanan |
| 8,209,330 B1 | 6/2012 | Covell |
| 8,239,364 B2 | 8/2012 | Wable |
| 8,244,848 B1 | 8/2012 | Narayanan |
| 8,271,471 B1 | 9/2012 | Kamvar |
| 8,271,546 B2 | 9/2012 | Gibbs |
| 8,301,639 B1 | 10/2012 | Myllymaki |
| 8,306,922 B1 | 11/2012 | Kunal |
| 8,312,056 B1 | 11/2012 | Peng |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,578,274 B2 | 11/2013 | Druzgalski |
| 8,595,297 B2 | 11/2013 | Marcucci |
| 8,601,027 B2 | 12/2013 | Behforooz |
| 8,606,721 B1 | 12/2013 | Dicker |
| 8,639,725 B1 | 1/2014 | Udeshi |
| 8,732,208 B2 | 5/2014 | Lee |
| 8,751,521 B2 | 6/2014 | Lee |
| 8,775,324 B2 | 7/2014 | Zhu |
| 8,782,080 B2 | 7/2014 | Lee |
| 8,782,753 B2 | 7/2014 | Lunt |
| 8,832,111 B2 | 9/2014 | Venkataramani |
| 8,868,590 B1 | 10/2014 | Donneau-Golencer |
| 8,868,603 B2 * | 10/2014 | Lee .............. G06F 17/30392 707/771 |
| 8,898,226 B2 | 11/2014 | Tiu |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,935,255 B2 | 1/2015 | Sankar |
| 8,935,261 B2 | 1/2015 | Pipegrass |
| 8,935,271 B2 | 1/2015 | Lassen |
| 8,949,232 B2 | 2/2015 | Harrington |
| 8,949,250 B1 | 2/2015 | Garg |
| 8,949,261 B2 | 2/2015 | Lunt |
| 8,954,675 B2 | 2/2015 | Venkataramani |
| 8,983,991 B2 | 3/2015 | Sankar |
| 9,098,808 B1 * | 8/2015 | Ventilla ................ G06N 5/04 |
| 9,105,068 B2 * | 8/2015 | Lee ............... G06F 17/30867 |
| 2002/0059199 A1 | 5/2002 | Harvey |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0243568 A1 | 12/2004 | Wang |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0041597 A1 | 2/2006 | Conrad |
| 2006/0117378 A1 | 6/2006 | Tam |
| 2006/0136419 A1 | 6/2006 | Brydon |
| 2006/0190436 A1 | 8/2006 | Richardson |
| 2006/0218111 A1 | 9/2006 | Cohen |
| 2007/0174304 A1 | 7/2007 | Shrufi |
| 2007/0192293 A1 | 8/2007 | Swen |
| 2007/0277100 A1 | 11/2007 | Sheha |
| 2008/0005064 A1 | 1/2008 | Sarukkai |
| 2008/0033926 A1 | 2/2008 | Matthews |
| 2008/0072180 A1 | 3/2008 | Chevalier |
| 2008/0114730 A1 | 5/2008 | Larimore |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0054043 A1 | 2/2009 | Hamilton |
| 2009/0094200 A1 | 4/2009 | Baeza-Yates |
| 2009/0164408 A1 | 6/2009 | Grigorik |
| 2009/0164431 A1 | 6/2009 | Zivkovic |
| 2009/0164929 A1 | 6/2009 | Chen |
| 2009/0197681 A1 | 8/2009 | Krishnamoorthy |
| 2009/0222348 A1 | 9/2009 | Ransom |
| 2009/0228296 A1 | 9/2009 | Ismalon |
| 2009/0259624 A1 | 10/2009 | DeMaris |
| 2009/0259646 A1 | 10/2009 | Fujita |
| 2009/0265326 A1 | 10/2009 | Lehrman |
| 2009/0271370 A1 | 10/2009 | Jagadish |
| 2009/0271374 A1 | 10/2009 | Korn |
| 2009/0276414 A1 | 11/2009 | Gao |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0082695 A1 | 4/2010 | Hardt |
| 2010/0125562 A1 | 5/2010 | Nair |
| 2010/0145771 A1 | 6/2010 | Fligler |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0250526 A1 | 9/2010 | Prochazka |
| 2010/0321399 A1 | 12/2010 | Ellren |
| 2011/0004609 A1 | 1/2011 | Chitiveli |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0184981 A1 | 7/2011 | Lu |
| 2011/0191371 A1 | 8/2011 | Elliott |
| 2011/0196855 A1 | 8/2011 | Wable |
| 2011/0231296 A1 | 9/2011 | Gross |
| 2011/0276396 A1 | 11/2011 | Rathod |
| 2011/0313992 A1 | 12/2011 | Groeneveld |
| 2011/0320470 A1 | 12/2011 | Williams |
| 2012/0042020 A1 | 2/2012 | Kolari |
| 2012/0047147 A1 | 2/2012 | Redstone |
| 2012/0059708 A1 | 3/2012 | Galas |
| 2012/0110080 A1 | 5/2012 | Panyam |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185472 A1 | 7/2012 | Ahmed |
| 2012/0185486 A1 | 7/2012 | Voigt |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0290950 A1 | 11/2012 | Rapaport |
| 2012/0310922 A1 | 12/2012 | Johnson |
| 2012/0311034 A1 | 12/2012 | Goldband |
| 2012/0317088 A1 | 12/2012 | Pantel |
| 2012/0331063 A1 | 12/2012 | Rajaram |
| 2013/0031106 A1 | 1/2013 | Schechter |
| 2013/0031113 A1 | 1/2013 | Feng |
| 2013/0041876 A1 | 2/2013 | Dow |
| 2013/0066876 A1 | 3/2013 | Raskino |
| 2013/0073400 A1 | 3/2013 | Heath |
| 2013/0085970 A1 | 4/2013 | Karnik |
| 2013/0086024 A1 | 4/2013 | Liu |
| 2013/0086057 A1 | 4/2013 | Harrington |
| 2013/0097140 A1 | 4/2013 | Scheel |
| 2013/0124538 A1 | 5/2013 | Lee |
| 2013/0124542 A1 | 5/2013 | Lee |
| 2013/0144899 A1 | 6/2013 | Lee |
| 2013/0191372 A1 | 7/2013 | Lee |
| 2013/0191416 A1 | 7/2013 | Lee |
| 2013/0198219 A1 | 8/2013 | Cohen |
| 2013/0204737 A1 | 8/2013 | Agarwal |
| 2013/0226918 A1 | 8/2013 | Berkhim |

(56) References Cited

U.S. PATENT DOCUMENTS

| | | |
|---|---|---|
| 2013/0227011 A1 | 8/2013 | Sharma |
| 2013/0246404 A1 | 9/2013 | Annau |
| 2013/0254155 A1 | 9/2013 | Thollot |
| 2013/0254305 A1 | 9/2013 | Cheng |
| 2014/0006416 A1 | 1/2014 | Leslie |
| 2014/0067535 A1 | 3/2014 | Rezaei |
| 2014/0122465 A1 | 5/2014 | Bilinski |
| 2014/0280080 A1 | 9/2014 | Solheim |
| 2014/0304429 A1 | 10/2014 | Softky |
| 2014/0337371 A1* | 11/2014 | Li ............... G06F 17/30958 707/767 |
| 2015/0006566 A1* | 1/2015 | Lee ............... G06F 17/30392 707/767 |
| 2015/0074289 A1 | 3/2015 | Hyman |
| 2015/0081686 A1* | 3/2015 | Lee ............... G06F 17/30392 707/723 |
| 2015/0161519 A1 | 6/2015 | Zhong |
| 2015/0286643 A1 | 10/2015 | Kumar |
| 2015/0363402 A1 | 12/2015 | Jackson |
| 2016/0026727 A1 | 1/2016 | Bar-Yossef |
| 2016/0041982 A1 | 2/2016 | He |
| 2016/0063093 A1 | 3/2016 | Boucher |
| 2016/0063115 A1 | 3/2016 | Ayan |
| 2016/0162502 A1 | 6/2016 | Zhou |
| 2016/0170982 A1* | 6/2016 | Djuric ............... G06N 3/0454 707/740 |
| 2016/0203238 A1 | 7/2016 | Cherniavskii |
| 2016/0292149 A1* | 10/2016 | Mote ............... G06F 17/2785 |
| 2018/0144253 A1* | 5/2018 | Merhav ............... G06Q 50/01 |

OTHER PUBLICATIONS

Qadir, Ashequl, et al., "Semantic Lexicon Induction from Twitter with Pattern Relatedness and Flexible Term Length", Proc. of the Twenty-Ninth AAAI Conference on Artificial Intelligence, Austin, TX, Jan. 25-30, 2015, pp. 2432-2439.*
U.S. Appl. No. 14/949,436, filed Nov. 23, 2015, Weston.
U.S. Appl. No. 14/952,707, filed Nov. 25, 2015, Evnine.
U.S. Appl. No. 14/981,413, filed Dec. 28, 2015, Paluri.
U.S. Appl. No. 14/984,956, filed Dec. 30, 2015, Weston.
U.S. Appl. No. 15/260,214, filed Sep. 8, 2016, Gupta.
U.S. Appl. No. 15/286,315, filed Oct. 6, 2016, Green.
U.S. Appl. No. 15/365,797, filed Nov. 30, 2016, Wang.

* cited by examiner

EMBEDDING-BASED PARSING OF SEARCH QUERIES ON ONLINE SOCIAL NETWORKS

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, the social-networking system may analyze a search query comprising a plurality of n-grams to determine intended word senses for the n-grams (i.e., word-sense disambiguation). Each n-gram may have multiple related word senses. A word sense of a first n-gram may refer to a second n-gram representing a concept or a meaning of the first n-gram. Word senses may be determined for each n-gram of the query. Each word sense of an n-gram may have an initial relatedness-score, which may be based on how often the word sense is the intended word sense for the n-gram generally. The relatedness-score may be adjusted based on a context-score for the word sense. A context-score for a context may be calculated as a sum of similarity metrics of the embedding of the word sense and the embeddings of each other word sense corresponding to each other n-grams in the query. For each n-gram, the word sense with the highest relatedness-score may be selected, which may represent the most likely intended word sense of the n-gram. The selected word senses may be used to return relevant search results to the query. One technical problem for search engine systems of online social networks may be returning search results that are relevant to a query when there are hundreds of millions, or possibly billions, of objects to search through. When search results that are less relevant to the query are returned to the user, the user may have to execute further queries in an attempt to find more relevant results, burdening the search engine with additional requests, thereby consuming additional computing resources. Embodiments described herein may provide the technical advantage of providing more relevant results based on the intended word senses of the n-grams of the query, which may, for example, allow fewer search results to be returned, reduce the amount of content that must be delivered, and reduce the time a querying user must spend interacting with a search-results interface to find a relevant search result. This may improve the overall efficiency of the search engine by reducing the amount of computing resources consumed per querying user.

In particular embodiments, the social-networking system may determine head-terms and modifier-terms of a query to return relevant search results. A head-term of a phrase may be an n-gram that determines the syntactic type of the phrase and a head-term of a compound may be the stem that determines the semantic category of the compound. The other n-grams of a phrase or compound may be modifier-terms. To identify head-terms and modifier-terms in such a query, the social-networking system may use a syntactic model. A syntactic model may be based on a data-structure mapping head-terms to modifier-terms, and the data structure may be generated by a frequency analysis of a corpus of phrases. A syntactic model may also be based on a machine learning model. A machine learning model may be trained using a data structure of head-terms and corresponding modifier-terms, and may output a probability for a pair of n-grams that one n-gram is a head-term and one n-gram is a modifier-term. Identifying head-terms and modifier-terms of a search query may allow more relevant results to be returned to a user. One technical problem for search engine systems of online social networks may be returning search results that are relevant to a query when there are hundreds of millions, or possibly billions, of objects to search through. When search results that are less relevant to the query are returned to the user, the user may have to execute further queries in an attempt to find more relevant results, burdening the search engine with additional requests, thereby consuming additional computing resources. Embodiments described herein may provide the technical advantage of providing more relevant results based on a head-term of the query of the query, which may, for example, allow fewer search results to be returned, reduce the amount of content that must be delivered, and reduce the time a querying user must spend interacting with a search-results interface to find a relevant search result. This may improve the overall efficiency of the search engine by reducing the amount of computing resources consumed per querying user.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
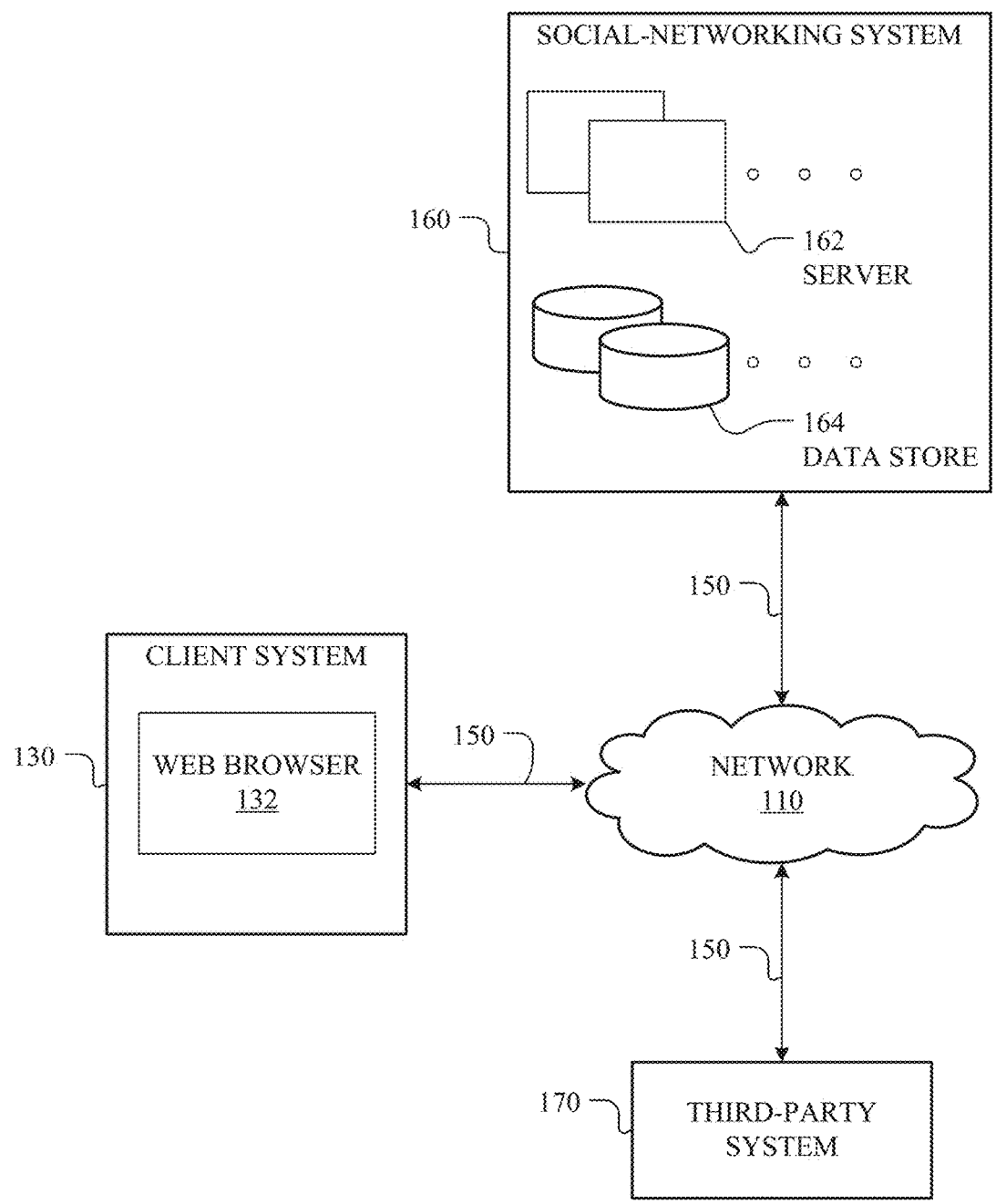
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
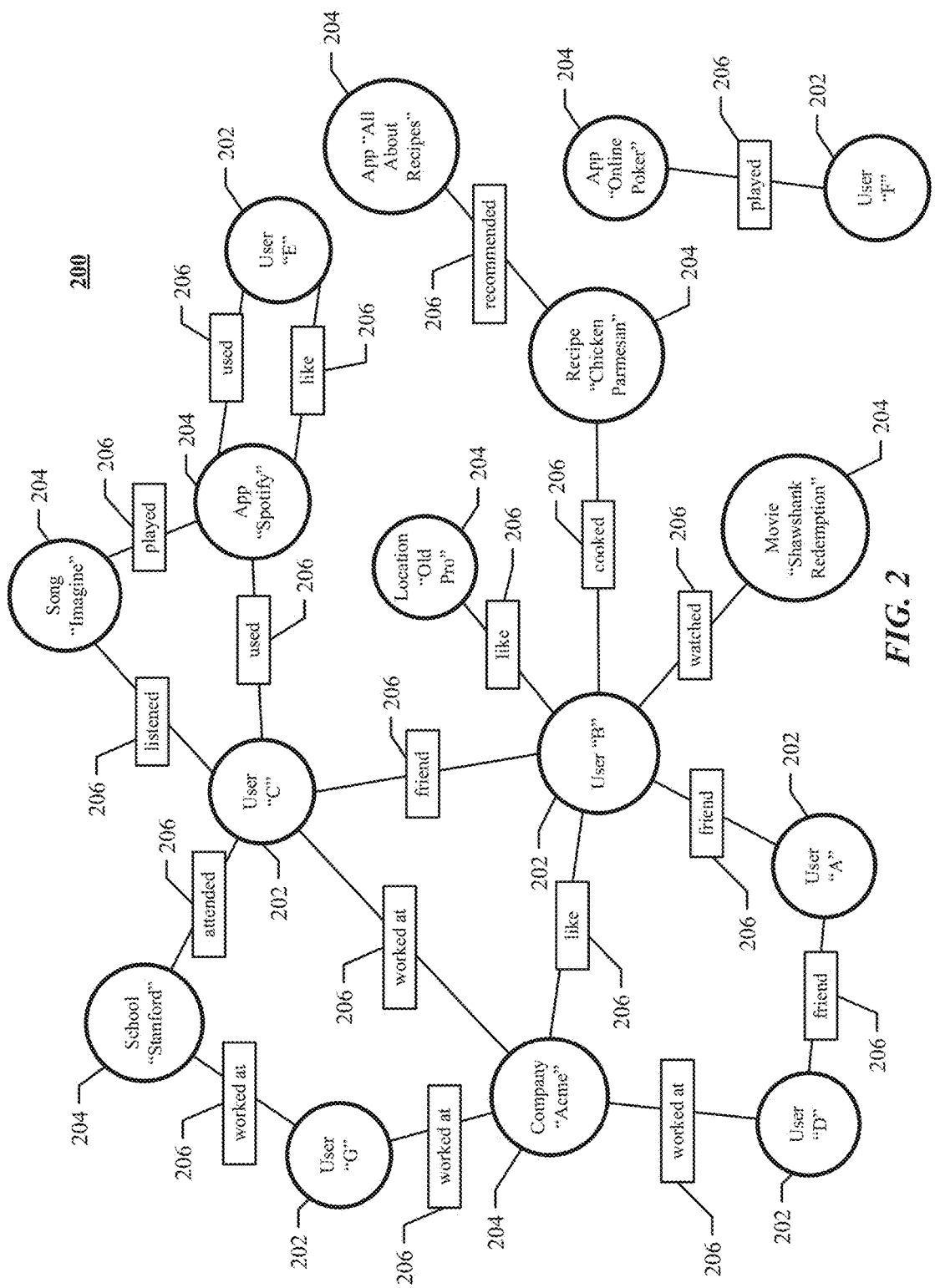
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more web interfaces.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more web interfaces.

In particular embodiments, a node in the social graph 200 may represent or be represented by a web interface (which may be referred to as a "profile interface"). Profile interfaces may be hosted by or accessible to the social-networking system 160. Profile interfaces may also be hosted on third-party websites associated with a third-party server 170. As an example and not by way of limitation, a profile interface corresponding to a particular external web interface may be the particular external web interface and the profile interface may correspond to a particular concept node 204. Profile interfaces may be viewable by all or a selected subset of other users. As an example and not by way of limitation, a user node 202 may have a corresponding user-profile interface in which the corresponding user may add content, make declarations, or otherwise express himself or herself. As another example and not by way of limitation, a concept node 204 may have a corresponding concept-profile interface in which one or more users may add content, make declarations, or express themselves, particularly in relation to the concept corresponding to concept node 204.

In particular embodiments, a concept node 204 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party web interface or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile interface corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile interface (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile interface. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, the social-networking system 160 may receive, from a client system of a user of an online social network, a query inputted by the user. The user may submit the query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile interfaces, content-profile interfaces, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile interfaces, external web interfaces, or any combination thereof. The social-networking system 160 may then generate a search-results interface with search results corresponding to the identified content and send the search-results interface to the user. The search results may be presented to the user, often in the form of a list of links on the search-results interface, each link being associated with a different interface that contains some of the identified resources or content. In particular embodiments, each link in the search results may be in the form of a Uniform Resource Locator (URL) that specifies where the corresponding interface is located and the mechanism for retrieving it. The social-networking system 160 may then send the search-results interface to the web browser 132 on the user's client system 130. The user may then click on the URL links or otherwise select the content from the search-results interface to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested interface (such as, for example, a user-profile interface, a concept-profile interface, a search-results interface, a user interface/view state of a native application associated with the online social network, or another suitable interface of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile interfaces and respective user nodes 202 or concept nodes 204, such as a profile interface named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile interfaces and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Indexing Based on Object-Type

Figure 3:
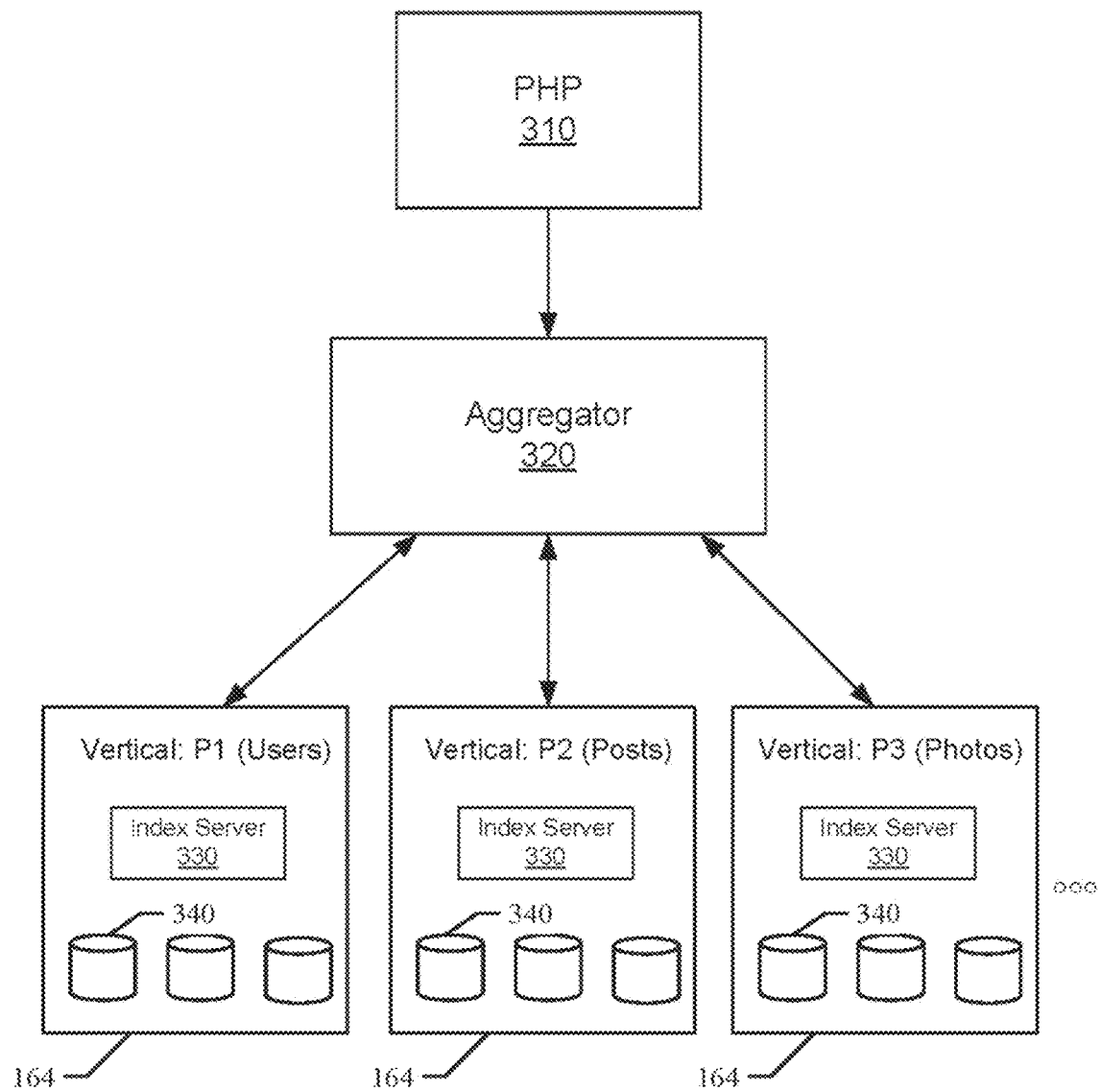
FIG. 3 illustrates an example partitioning for storing objects.

FIG. 3 illustrates an example partitioning for storing objects of a social-networking system 160. A plurality of data stores 164 (which may also be called "verticals") may store objects of social-networking system 160. The amount of data (e.g., data for a social graph 200) stored in the data stores may be very large. As an example and not by way of limitation, a social graph used by Facebook, Inc. of Menlo Park, Calif. can have a number of nodes in the order of $10^8$, and a number of edges in the order of $10^{10}$. Typically, a large collection of data such as a large database may be divided into a number of partitions. As the index for each partition of a database is smaller than the index for the overall database, the partitioning may improve performance in accessing the database. As the partitions may be distributed over a large number of servers, the partitioning may also improve performance and reliability in accessing the database. Ordinarily, a database may be partitioned by storing rows (or columns) of the database separately. In particular embodiments, a database maybe partitioned based on object-types. Data objects may be stored in a plurality of partitions, each partition holding data objects of a single object-type. In particular embodiments, social-networking system 160 may retrieve search results in response to a search query by submitting the search query to a particular partition storing objects of the same object-type as the search query's expected results. Although this disclosure describes storing objects in a particular manner, this disclosure contemplates storing objects in any suitable manner.

In particular embodiments, each object may correspond to a particular node of a social graph 200. An edge 206 connecting the particular node and another node may indicate a relationship between objects corresponding to these nodes. In addition to storing objects, a particular data store may also store social-graph information relating to the object. Alternatively, social-graph information about particular objects may be stored in a different data store from the objects. Social-networking system 160 may update the search index of the data store based on newly received objects, and relationships associated with the received objects.

In particular embodiments, each data store 164 may be configured to store objects of a particular one of a plurality of object-types in respective data storage devices 340. An object-type may be, for example, a user, a photo, a post, a comment, a message, an event listing, a web interface, an application, a location, a user-profile interface, a concept-profile interface, a user group, an audio file, a video, an offer/coupon, or another suitable type of object. Although this disclosure describes particular types of objects, this disclosure contemplates any suitable types of objects. As an example and not by way of limitation, a user vertical P1 illustrated in FIG. 3 may store user objects. Each user object stored in the user vertical P1 may comprise an identifier (e.g., a character string), a user name, and a profile picture for a user of the online social network. Social-networking system 160 may also store in the user vertical P1 information associated with a user object such as language, location, education, contact information, interests, relationship status, a list of friends/contacts, a list of family members, privacy settings, and so on. As an example and not by way of limitation, a post vertical P2 illustrated in FIG. 3 may store post objects. Each post object stored in the post vertical P2 may comprise an identifier, a text string for a post posted to social-networking system 160. Social-networking system 160 may also store in the post vertical P2 information associated with a post object such as a time stamp, an author, privacy settings, users who like the post, a count of likes, comments, a count of comments, location, and so on. As an example and not by way of limitation, a photo vertical P3 may store photo objects (or objects of other media types such as video or audio). Each photo object stored in the photo vertical P3 may comprise an identifier and a photo. Social-networking system 160 may also store in the photo vertical P3 information associated with a photo object such as a time stamp, an author, privacy settings, users who are tagged in the photo, users who like the photo, comments, and so on. In particular embodiments, each data store may also be configured to store information associated with each stored object in data storage devices 340.

In particular embodiments, objects stored in each vertical 164 may be indexed by one or more search indices. The search indices may be hosted by respective index server 330 comprising one or more computing devices (e.g., servers). The index server 330 may update the search indices based on data (e.g., a photo and information associated with a photo) submitted to social-networking system 160 by users or other processes of social-networking system 160 (or a third-party system). The index server 330 may also update the search indices periodically (e.g., every 24 hours). The index server 330 may receive a query comprising a search term, and access and retrieve search results from one or more search indices corresponding to the search term. In some embodiments, a vertical corresponding to a particular object-type may comprise a plurality of physical or logical partitions, each comprising respective search indices.

In particular embodiments, social-networking system 160 may receive a search query from a PHP (Hypertext Preprocessor) process 310. The PHP process 310 may comprise one or more computing processes hosted by one or more servers 162 of social-networking system 160. The search query may be a text string or a search query submitted to the PHP process by a user or another process of social-networking system 160 (or third-party system 170). In particular embodiments, an aggregator 320 may be configured to receive the search query from PHP process 310 and distribute the search query to each vertical. The aggregator may comprise one or more computing processes (or programs) hosted by one or more computing devices (e.g. servers) of the social-networking system 160. Particular embodiments may maintain the plurality of verticals 164 as illustrated in FIG. 3. Each of the verticals 164 may be configured to store a single type of object indexed by a search index as described earlier. In particular embodiments, the aggregator 320 may receive a search request. For example, the aggregator 320 may receive a search request from a PHP (Hypertext Preprocessor) process 210 illustrated in FIG. 2. In particular embodiments, the search request may comprise a text string. The search request may be a structured or substantially unstructured text string submitted by a user via a PHP process. The search request may also be structured or a substantially unstructured text string received from another process of the social-networking system. In particular embodiments, the aggregator 320 may determine one or more search queries based on the received search request (step 303). In particular embodiments, each of the search queries may have a single object type for its expected results (i.e., a single result-type). In particular embodiments, the aggregator 320 may, for each of the search queries, access and retrieve search query results from at least one of the verticals 164, wherein the at least one vertical 164 is configured to store objects of the object type of the search query (i.e., the result-type of the search query). In particular embodiments, the aggregator 320 may aggregate search query results of the respective search queries. For example, the aggregator 320 may submit a search query to a particular vertical and access index server 330 of the vertical, causing index server 330 to return results for the search query.

More information on indexes and search queries may be found in U.S. patent application Ser. No. 13/560,212, filed 27 Jul. 2012, U.S. patent application Ser. No. 13/560,901, filed 27 Jul. 2012, U.S. patent application Ser. No. 13/723,861, filed 21 Dec. 2012, and U.S. patent application Ser. No. 13/870,113, filed 25 Apr. 2013, each of which is incorporated by reference.

Embedding Spaces

Figure 4:
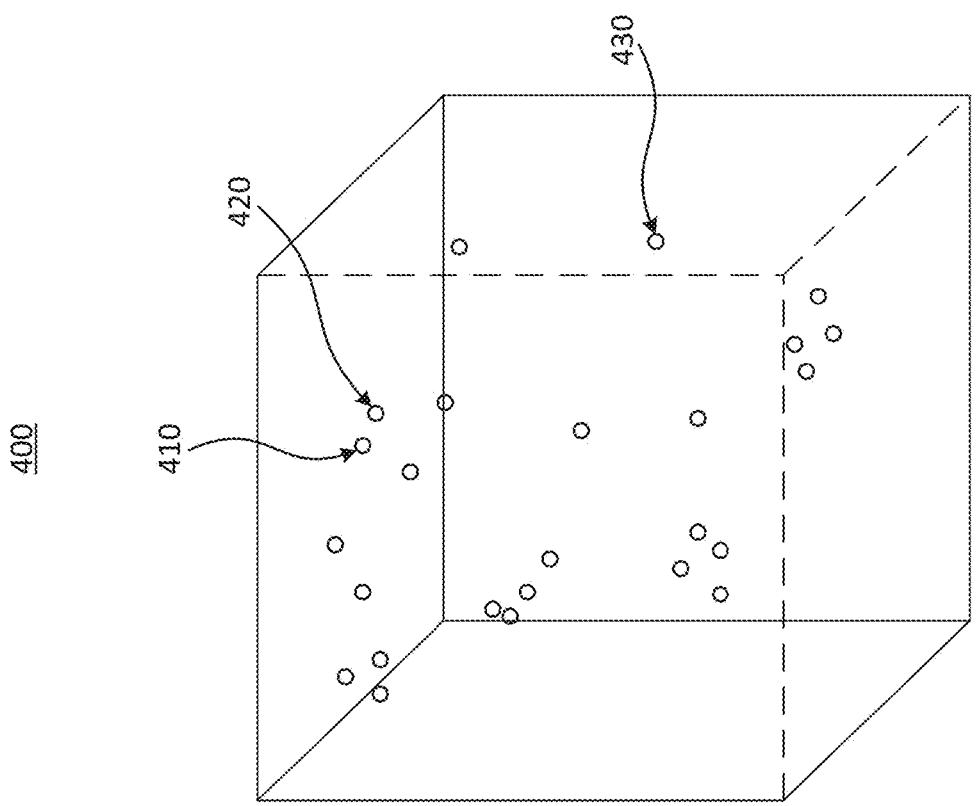
FIG. 4 illustrates an example view of an embedding space.

FIG. 4 illustrates an example view of an embedding space 400. In particular embodiments, n-grams may be represented in a d-dimensional embedding space, where d denotes any suitable number of dimensions. Although the embedding space 400 is illustrated as a three-dimensional space, this is for illustrative purposes only, as the embedding space 400 may be of any suitable dimension. In particular embodiments, an n-gram may be represented in the embedding space 400 as a vector referred to as a term embedding. Each vector may comprise coordinates corresponding to a particular point in the embedding space 400 (i.e., the terminal point of the vector). As an example and not by way of limitation, embeddings 410, 420, and 430 may be represented as points in the embedding space 400, as illustrated in FIG. 4. An n-gram may be mapped to a respective vector representation. As an example and not by way of limitation, n-grams $t_1$ and $t_2$ may be mapped to vectors $\vec{v}_1$ and $\vec{v}_2$ in the embedding space 400, respectively, by applying a function $\vec{\pi}$ defined by a dictionary, such that $\vec{v}_1 = \vec{\pi}(t_1)$ and $\vec{v}_2 = \vec{\pi}(t_2)$. As another example and not by way of limitation, a dictionary trained to map text to a vector representation may be utilized, or such a dictionary may be itself generated via training. As another example and not by way of limitation, a model, such as Word2vec, may be used to map an n-gram to a vector representation in the embedding space 400. In particular embodiments, an n-gram may be mapped to a vector representation in the embedding space 400 by using a deep-leaning model (e.g., a neural network). The deep-learning model may have been trained using a sequence of training data (e.g., a corpus of objects each comprising n-grams). In particular embodiments, objects may be mapped to an embedding in the embedding space 400. An embedding $\vec{\pi}(e)$ of object e may be based on one or more properties, attributes, or features of the object, relationships of the object with other objects, or any other suitable information associated with the object. As an example and not by way of limitation, an embedding $\vec{\pi}(e)$ of object e may be based on one or more n-grams associated with object e. In particular embodiments, an object may be mapped to a vector representation in the embedding space 400 by using a deep-learning model. In particular embodiments, the social-networking system 160 may utilize one or more systems, components, elements, functions, methods, operations, or steps disclosed in U.S. patent application Ser. No. 14/949,436, filed 23 Nov. 2015, which is incorporated by reference. Although this disclosure describes representing an n-gram or an object in an embedding space in a particular manner, this disclosure contemplates representing an n-gram or an object in an embedding space in any suitable manner.

In particular embodiments, the social-networking system 160 may calculate a similarity metric of embeddings in embedding space 400. A similarity metric may be a cosine similarity, a Minkowski distance, a Mahalanobis distance, a Jaccard similarity coefficient, or any suitable similarity metric. As an example and not by way of limitation, a similarity metric of $\vec{v}_1$ and $\vec{v}_2$ may be a cosine similarity $$\frac{\vec{v_1} \cdot \vec{v_2}}{\|\vec{v_1}\| \cdot \|\vec{v_2}\|}.$$

As another example and not by way of limitation, a similarity metric of $\vec{v}_1$ and $\vec{v}_2$ may be a Euclidean distance $\|\vec{v}_1 - \vec{v}_2\|$. A similarity metric of two embeddings may represent how similar the two objects corresponding to the two embeddings, respectively, are to one another, as measured by the distance between the two embeddings in the embedding space 400. As an example and not by way of limitation, embedding 410 and embedding 420 may correspond to objects that are more similar to one another than the objects corresponding to embedding 410 and embedding 430, based on the distance between the respective embeddings.

Embedding-Based Parsing of Search Queries

In particular embodiments, the social-networking system 160 may analyze a search query comprising a plurality of n-grams to determine intended word senses for the n-grams (i.e., word-sense disambiguation). As used herein, n-grams may be words or groups of words, any part of speech, punctuation marks (e.g., "!"), colloquialisms (e.g., "go nuts"), acronyms (e.g., "BRB"), abbreviations (e.g., "mgmt."), exclamations (e.g., "ugh"), alphanumeric characters, symbols, written characters, accent marks, or any combination thereof. Each n-gram may have multiple related word senses. As used herein, a word sense of a first n-gram may refer to a second n-gram representing a concept or a meaning of the first n-gram. As an example and not by way of limitation, the n-gram "bass" may have multiple word senses, such as "sound", "instrument", or "fish". Word senses may be determined for each n-gram of the query. Each word sense of an n-gram may have a relatedness-score that may be the sum of an initial-score and a context-score. The initial-score may be based on how often the word sense is the intended word sense for the n-gram generally. The context-score may be calculated as a sum of similarity metrics of the embedding of the word sense and the embeddings of each other word sense corresponding to each other n-grams in the query. For each n-gram, the word sense with the highest relatedness-score may be selected, which may represent the most likely intended word sense of the n-gram. The selected word senses may be used to return relevant search results to the query. One technical problem for search engine systems of online social networks may be returning search results that are relevant to a query when there are hundreds of millions, or possibly billions, of objects to search through. When search results that are less relevant to the query are returned to the user, the user may have to execute further queries in an attempt to find more relevant results, burdening the search engine with additional requests, thereby consuming additional computing resources. Embodiments described herein may provide the technical advantage of providing more relevant results based on the intended word senses of the n-grams of the query, which may, for example, allow fewer search results to be returned, reduce the amount of content that must be delivered, and reduce the time a querying user must spend interacting with a search-results interface to find a relevant search result. This may improve the overall efficiency of the search engine by reducing the amount of computing resources consumed per querying user. Although this disclosure describes analyzing a search query to determine word senses in a particular manner, this disclosure contemplates analyzing a search query to determine word senses in any suitable manner.

Figure 5:
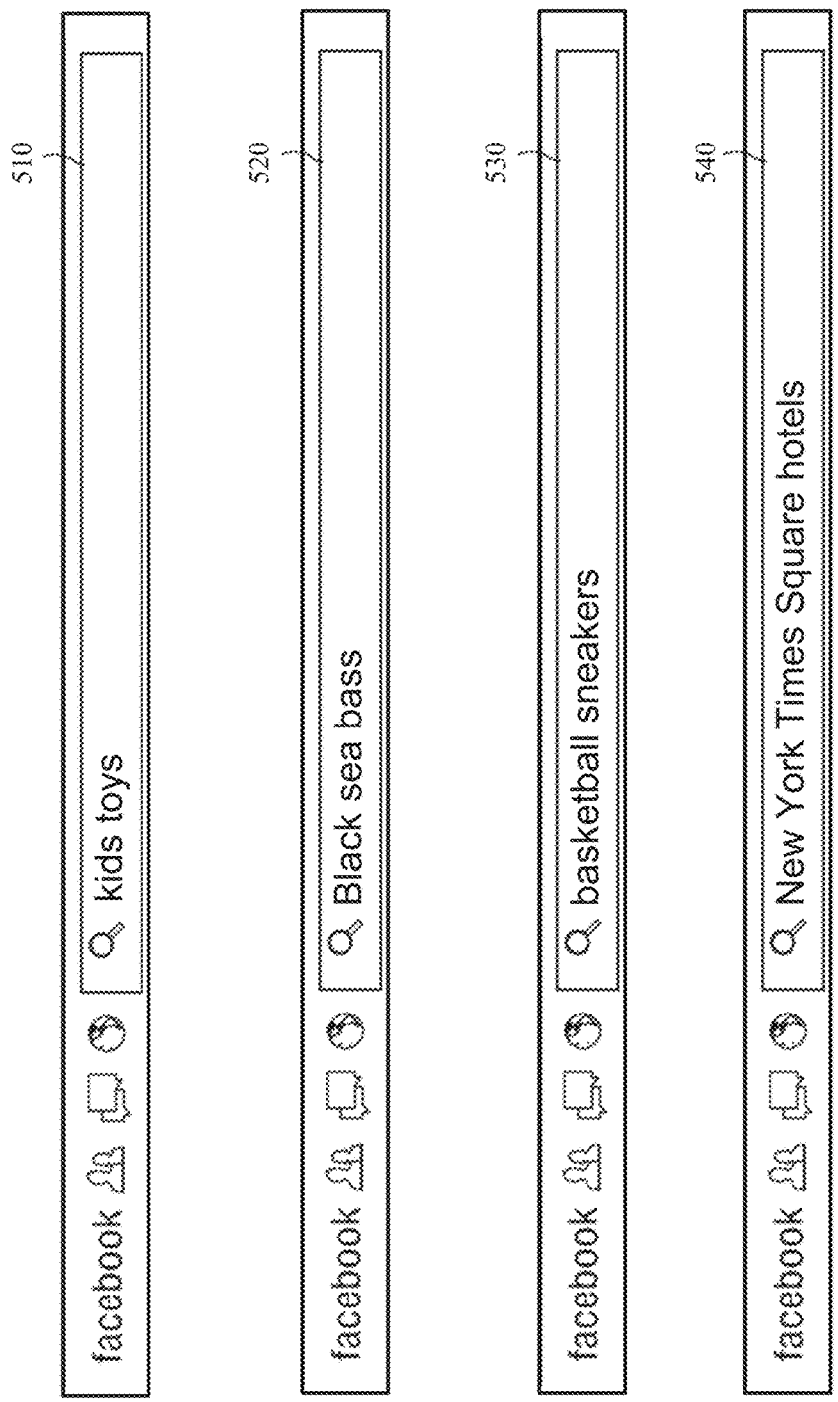
FIG. 5 illustrates example queries inputted into example search bars.

FIG. 5 illustrates example queries 510-540, each inputted into an example search bar of an example web interface. In particular embodiments, the social-networking system 160 may receive, from a client system 130 of a user of an online social network, a query inputted by the user. The query may comprise a plurality of n-grams. As an example and not by way of limitation, the querying user may have inputted the query 510 "kids toys", the query 520 "Black sea bass", the query 530 "basketball sneakers" or the query 540 "New York Times Square hotels". Although this disclosure describes receiving a query in a particular manner, this disclosure contemplates receiving a query in any suitable manner.

In particular embodiments, the social-networking system 160 may parse the query to identify a subset of n-grams of the plurality of n-grams. As an example and not by way of limitation, the query 510 may be parsed into the subset of n-grams <"kids", "toys">. In particular embodiments, parsing the query may comprise rewriting the query to remove one or more of the plurality of n-grams and identifying the subset of n-grams as the remaining n-grams. As an example and not by way of limitation, a query may be rewritten by removing stop words (e.g., "a," "an," "be," "the," etc.), which may be n-grams, such as function words, that are insignificant or would return many unnecessary results. As another example and not by way of limitation, n-grams that are subjective modifiers (e.g., "best" in the query "best cars") may be removed. Although this disclosure describes parsing a query in a particular manner, this disclosure contemplates parsing a query in any suitable manner.

Figure 6:
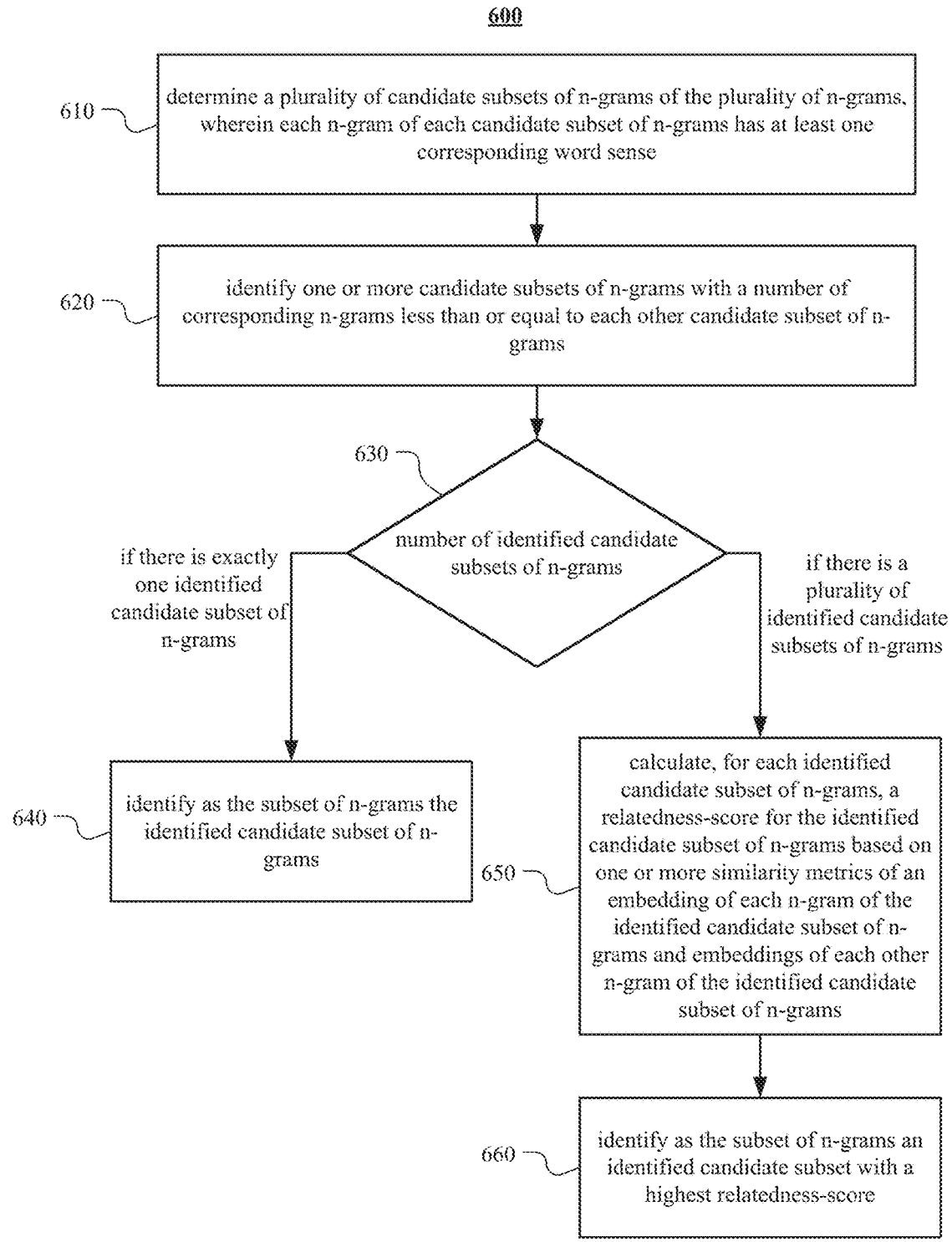
FIG. 6 illustrates an example method for parsing a query to identify a subset of n-grams.

FIG. 6 illustrates an example method 600 for parsing the query to identify the subset of n-grams of the plurality of n-grams. In particular embodiments, the social-networking system 160 may parse a query to identify the subset of n-grams, wherein the subset of n-grams has a minimum number of n-grams, and all n-grams of the subset of n-grams have at least one corresponding word sense. In cases where there are multiple possible subsets of n-grams that meet these criteria, the identified subset of n-grams may be the subset that meets these criteria and for which the n-grams are the most similar to one another. At step 610, the social-networking system 160 may determine a plurality of candidate subsets of n-grams of the plurality of n-grams, wherein each n-gram of each candidate subset of n-grams has at least one corresponding word sense. At step 620, the social-networking system 160 may identify one or more candidate subsets of n-grams with a number of corresponding n-grams less than or equal to each other candidate subset of n-grams. At step 630, if there is exactly one identified candidate subset of n-grams, then the method 600 may proceed to step 640, and if there is a plurality of identified candidate subsets of n-grams, then the method 600 may proceed to step 650. At step 640, the social-networking system 160 may identify as the subset of n-grams the identified candidate subset of n-grams. At step 650, the social-networking system 160 may calculate, for each identified candidate subset of n-grams, a relatedness-score for the identified candidate subset of n-grams based on one or more similarity metrics of an embedding of each n-gram of the identified candidate subset of n-grams and embeddings of each other n-gram of the identified candidate subset of n-grams. At step 660, the social-networking system 160 may identify as the subset of n-grams an identified candidate subset with a highest relatedness-score. As an example and not by way of limitation, the query may be "mad dog trainer". The social-networking system 160 may determine a plurality of candidate subsets of n-grams that include ⟨"mad", "dog", "trainer"⟩, ⟨"mad dog", "trainer"⟩, and ⟨"mad", "dog trainer"⟩. The subset of n-grams ⟨"mad dog trainer"⟩, for example, may not be a candidate subset of n-grams because the n-gram "mad dog trainer" may have no corresponding word senses. The social-networking system 160 may identify the candidate subsets of n-grams ⟨"mad dog", "trainer"⟩ and ⟨"mad", "dog trainer"⟩ because both candidate subsets have 2 or fewer n-grams, which is less than or equal to the number of n-grams in any of the candidate subsets. Because there are a plurality of identified candidate subsets of n-grams, the social-networking system 160 may calculate, for each identified candidate subset of n-grams, a relatedness-score. If, for example, the similarity score is a cosine similarity, a relatedness-score for the identified subset of n-grams ⟨"mad dog", "trainer"⟩ may be calculated as $$\frac{\vec{\pi}(\text{``mad dog''}) \cdot \vec{\pi}(\text{``trainer''})}{\|\vec{\pi}(\text{``mad dog''})\| \|\vec{\pi}(\text{``trainer''})\|}$$

and a relatedness-score for the identified subset of n-grams ⟨"mad", "dog trainer"⟩ may be calculated as $$\frac{\vec{\pi}(\text{``mad''}) \cdot \vec{\pi}(\text{``dog trainer''})}{\|\vec{\pi}(\text{``mad''})\| \|\vec{\pi}(\text{``dog trainer''})\|}.$$

The social-networking system 160 may identify as the subset of n-grams the candidate subset of n-grams with the highest relatedness-score. For example, if the relatedness-score for ⟨"mad dog", "trainer"⟩ is 0.12 and the relatedness-score for ⟨"mad", "dog trainer"⟩ is 0.23, then ⟨"mad", "dog trainer"⟩ may be identified as the subset of n-grams. As another example and not by way of limitation, referencing FIG. 5, the query may be the query 540 "New York Times Square hotels". The social-networking system 160 may determine a plurality of candidate subsets of n-grams that include ⟨"New", "York", "Times", "Square", "hotels"⟩, ⟨"New York", "Times Square", "hotels"⟩, ⟨"New York Times", "Square", "hotels"⟩ and ⟨"New York Times Square", "hotels"⟩. The subset of n-grams ⟨"New", "York Times", "Square", "hotels"⟩, for example, may not be a candidate subset of n-grams because the n-gram "York Times" may have no corresponding word senses. The social-networking system 160 may identify the candidate subset of n-grams ⟨"New York Times Square", "hotels"⟩ because this candidate subset has 2 or fewer n-grams, which is less than or equal to the number of n-grams in any of the candidate subsets. Because there is exactly one identified candidate subset of n-grams, the social-networking system 160 may identify ⟨"New York Times Square", "hotels"⟩ as the subset of n-grams. Although this disclosure describes parsing a query in a particular manner, this disclosure contemplates parsing a query in any suitable manner.

In particular embodiments, the social-networking system 160 may generate, for each identified n-gram, an embedding of the n-gram. The embeddings may correspond to points in a d-dimensional embedding space. As an example and not by way of limitation, for the query 510, identified n-grams may be <"kids", "toys">. The social-networking system 160 may generate embeddings $\vec{v}_1 = \vec{\pi}(\text{``kids''})$ and $\vec{v}_2 = \vec{\pi}(\text{``toys''})$ for the identified n-grams. As discussed above, the embeddings may be determined based on a machine learning model. Although this disclosure describes generating an embedding of an n-gram in a particular manner, this disclosure contemplates generating an embedding of an n-gram in any suitable manner.

In particular embodiments, the social-networking system 160 may determine, for each identified n-gram, one or more word senses corresponding to one or more embeddings of the word senses, respectively. In particular embodiments, word senses for an identified n-gram may be synonyms (i.e., a word sense for an identified n-gram may be interchangeable with the identified n-gram for at least some usage of the identified n-gram). An identified n-gram and a word sense for the identified n-gram may be synonyms if they are related by, for example, hypernymy (e.g., tiger is a hypernym of feline), by hyponymy (e.g., feline is a hyponym of lion), as coordinate terms (e.g., lion is a coordinate term of tiger), by meronymy (e.g., wheels is a meronym of automobile), by holonymy (e.g., automobile is a holonym of wheels), by troponymy (e.g., nibble is a troponym of eat), or by entailment (e.g., to nibble is entailed by to eat). As an example and not by way of limitation, for the query 520 "Black sea bass," word senses determined for the n-gram "bass" may include "fish," "instrument," and "low pitch." Each word sense may be an n-gram with a corresponding embedding. As an example and not by way of limitation, if "fish," "instrument," and "low pitch" are the determined word senses for the identified n-gram "bass," the word senses may have the corresponding embeddings $\vec{\pi}(\text{``fish''})$, $\vec{\pi}(\text{``instrument''})$, and $\vec{\pi}(\text{``low pitch''})$, respectively. Although this disclosure describes determining word senses of an identified n-gram in a particular manner, this disclosure contemplates determining word senses of an identified n-gram in any suitable manner.

In particular embodiments, the social-networking system 160 may determine word senses for an n-gram based on one or more similarity metrics of the embedding of the n-gram and the embeddings of the one or more word senses, respectively. As an example and not by way of limitation, for the identified n-gram "bass," word sense "fish" may be determined based on the cosine similarity $$\frac{\vec{\pi}(\text{``bass''}) \cdot \vec{\pi}(\text{``fish''})}{\|\vec{\pi}(\text{``bass''})\| \|\vec{\pi}(\text{``fish''})\|}$$

having a value indicating that "bass" and "fish" are similar. In particular embodiments, the one or more word senses may comprise a specified number of the one or more word senses with the highest similarity metrics of the embedding of the n-gram and the embeddings of the one or more word senses, respectively. As an example and not by way of limitation, for the n-gram "bass", the social-networking system 160 may determine the 3 word senses with the highest cosine similarity of the embedding of "bass" which may correspond to the word senses "fish", "low pitch", and "instrument". In particular embodiments, the one or more word senses may comprise each word sense having a similarity metric greater than or equal to a threshold similarity metric of the embedding of the n-gram and the embedding of the word sense. As an example and not by way of limitation, for the n-gram "bass", a cosine similarity of the embedding of "bass" the embeddings of the word senses "fish", "low pitch", and "instrument" may be 0.8, 0.76, and 0.62, respectively. The word senses with at least a threshold cosine similarity of 0.75 may be selected, which may correspond to the word senses "fish" and "low pitch". In particular embodiments, the social-networking system 160 may determine word senses for an n-gram based on a lexical database. As an example and not by way of limitation, a lexical database such as WordNet, which may group together n-grams by semantic relationship, may be used to determine word senses of an identified n-gram. Although this disclosure describes determining word senses of an identified n-gram in a particular manner, this disclosure contemplates determining word senses of an identified n-gram in any suitable manner.

In particular embodiments, the social-networking system 160 may calculate, for each determined word sense for each identified n-gram, a relatedness-score for the word sense based on one or more similarity metrics of the embedding of the word sense and the embeddings of each of the one or more other word senses corresponding to the other identified n-grams, respectively. As an example and not by way of limitation, for the query 530 "basketball sneakers", the identified n-grams may be ⟨"basketball", "sneakers"⟩. The word senses for the identified n-gram "basketball" may be ⟨"ball", "game"⟩ and word senses for the identified n-gram "sneakers" may be ⟨"shoe", "stealthy people"⟩. A similarity function $R(w_1, w_2)$ may be a similarity score of the embeddings of $w_1$ and $w_2$. To calculate the relatedness-score for the word sense "ball" of the identified n-gram "basketball", the social-networking system 160 may calculate R("ball", "shoe")+R("ball", "stealthy people"), to calculate the relatedness-score for the word sense "game" of the identified n-gram "basketball", the social-networking system 160 may calculate R("game", "shoe")+R("game", "stealthy people"), to calculate the relatedness-score for the word sense "shoe" of the identified n-gram "sneakers", the social-networking system 160 may calculate R("shoe", "ball")+R("shoe", "game"), and to calculate the relatedness-score for the word sense "stealthy people" of the identified n-gram "sneakers", the social-networking system 160 may calculate R("stealthy people", "ball")+R("stealthy people", "game"). In particular embodiments, one or more similarity metrics may be calculated based on one or more cosine similarities of the embeddings of the word sense and the embeddings of each of the one or more other word senses corresponding to the other identified n-grams. As an example and not by way of limitation, $R(w_1, w_2)$ may be defined as a cosine similarity $$R(w_1, w_2) = \frac{\vec{\pi}(w_1) \cdot \vec{\pi}(w_2)}{\|\vec{\pi}(w_1)\|\|\vec{\pi}(w_2)\|}.$$

Although this disclosure describes calculating relatedness-scores in a particular manner, this disclosure contemplates calculating relatedness-scores in any suitable manner.

In particular embodiments, calculating the relatedness-score may comprise summing an initial-score for the word sense and a context-score for the word sense, and wherein the context-score may be a sum of the one or more similarity metrics of the embedding of the word sense and the embeddings of each of the one or more other word senses corresponding to the other identified n-grams, respectively. For an n-gram $w_i$, a context function $\vec{B}(w_i)$ may return all other identified n-grams and a word sense function $\vec{C}(w_i)$ may return the determined word senses for $w_i$. Further, $B_i$ may be the $i^{th}$ element of $\vec{B}$ and $C_i$ may be the $i^{th}$ element of $\vec{C}$. A relatedness-score $s_j'(w_i)$ of the $j^{th}$ word sense of an identified n-gram $w_i$ may be calculated as $s_j'(w_i)=s_j(w_i)+\Sigma_n\Sigma_m R[C_j(w_i), C_n(B_m(w_i))]$. As an example and not by way of limitation, for the query 520 "Black sea bass", the social-networking system 160 may identify the n-grams ⟨"Black", "sea", "bass"⟩, and the determined word senses for each of the n-grams may be $\vec{C}$("Black")=⟨"color", "dark", "grim"⟩, $\vec{C}$("sea")=⟨"salt water", "body of water"⟩, and $\vec{C}$("bass")=⟨"fish", "low pitch", "instrument"⟩. A relatedness-score for the word sense "dark" of the n-gram "Black" may be calculated as ("Black")=$s_2$("Black")+R("dark", "salt water")+R("dark", "body of water")+R("dark", "fish")+R("dark", "low pitch")+R("dark", "instrument"). The term $s_j(w_i)$ may represent an initial-score for the $j^{th}$ word sense of identified n-gram $w_i$. An initial-score may represent the frequency with which identified n-gram $w_i$ is associated with the $j^{th}$ word sense in training data (e.g., throughout a corpus of written phrases). As an example and not by way of limitation, if $s_2$("Black")=0.2 and $s_1$("Black")=0.58, this may indicate that the n-gram "Black" is more frequently used to mean "color" than it is used to mean "dark". In particular embodiments, the initial-score may be based on a similarity metric of the embedding of the n-gram and the embedding of the $j^{th}$ word sense. As an example and not by way of limitation, $s_1$("Black") may be calculated as $s_1$("Black")=R("black", "color"). The term $\Sigma_n\Sigma_m R[C_j(w_i), C_n(B_m(w_i))]$ may represent a context-score for the word sense. The context-score of a word sense may represent how likely a word sense is the intended meaning of the corresponding identified n-gram given the other identified n-grams. Although this disclosure describes calculating relatedness-scores in a particular manner, this disclosure contemplates calculating relatedness-scores in any suitable manner.

In particular embodiments, at least one of the word senses may comprise a plurality of terms, wherein the embedding of the word sense may be calculated as an average pooling of the embeddings of each term of the plurality of terms. As an example and not by way of limitation, if a word sense is "low pitch", $\vec{\pi}$("low pitch") may be calculated as $\vec{\pi}$("low pitch")=½[$\vec{\pi}$("low")+$\vec{\pi}$("pitch")]. As another example and not by way of limitation, if a word sense is "store-front business", $\vec{\pi}$("store-front business") may be calculated as $\vec{\pi}$("store-front business")=⅓[$\vec{\pi}$("store")+$\vec{\pi}$("front")+$\vec{\pi}$("business")]. This may be useful where, for example, there is no embedding for the plurality of terms as a whole. Alternatively, other types of pooling may be used (e.g., sum pooling). Although this disclosure calculating embeddings in a particular manner, this disclosure contemplates calculating embeddings in any suitable manner.

In particular embodiments, the social-network 160 may select, for each identified n-gram, one of the one or more word senses determined for the identified n-gram having one or more relatedness-scores, respectively, the selected word sense having a highest relatedness-score of the one or more respective relatedness-scores. As an example and not by way of limitation, in the query 520 "Black sea bass", the identified n-gram "bass" may have determined word senses ("fish", "low pitch", "instrument"), which may have calculated relatedness-scores of 0.89, 0.14 and 0.17, respectively. For the n-gram "bass", the word sense "fish" may be selected based on "fish" receiving the highest relatedness-score compared to the other word senses of "bass". As another example and not by way of limitation, for the query 530 "basketball sneakers", the n-gram "sneakers" may have determined word senses ("shoe", "stealthy people"), which may have calculated relatedness-scores of 0.92 and 0.06, respectively. For the n-gram "sneakers", the word sense "shoes" may be selected based on the relatedness-scores. Although this disclosure describes selecting a word sense for an identified n-gram in a particular manner, this disclosure contemplates selecting a word sense for an identified n-gram in any suitable manner.

In particular embodiments, the social-networking system 160 may identify one or more objects matching at least a portion of the query. As an example and not by way of limitation, in response to the query 520 "Black sea bass", the social-networking system 160 may identify an object corresponding to a recipe for black sea bass based on the object having n-grams that match the query. In particular embodiments, each object may be associated with one or more word senses and each identified object may be associated with at least one word sense matching one of the one or more selected word senses. As an example and not by way of limitation, for the query 530 "basketball sneakers", a selected word sense may be "shoe", and objects associated with the word sense "shoe" may be identified. Although this disclosure identifying objects in a particular manner, this disclosure contemplates identifying objects in any suitable manner.

In particular embodiments, the social-networking system 160 may rank each identified object based on a quality of matching of the object to one or more selected word senses. As an example and not by way of limitation, for the query 530 "basketball sneakers", a selected word sense may be "shoe" and identified objects may be ranked based on a quality of matching between the object and "shoe" (e.g., based on a term frequency-inverse documents frequency statistic for the n-gram "shoe" with respect to an identified object). In particular embodiments, an object may be associated with one or more topics and ranking the identified object may be further based on a quality of matching of the one or more topics of the identified object to one or more selected word senses. The social-networking system 160 may utilize a topic tagger to identify topics associated with identified objects, as disclosed in U.S. patent application Ser. No. 14/470,583, filed 27 Aug. 2014, which is incorporated herein by reference. As an example and not by way of limitation, for the query 530, a selected word sense may be "shoe" and an identified object with a topic that matches "shoe" may be ranker higher than other objects without a matching topic. In particular embodiments, an identified object may be of a particular object-type and ranking the identified object may be further based on a quality of matching of the object-type of the identified object to one or more selected word senses. As an example and not by way of limitation, if a query has a selected word sense of "person", an identified object that is of a user-type (i.e., user objects) may be ranked higher than objects of another type. In particular embodiments, an identified object may be of a particular item-type and ranking the identified object may be further based on a quality of matching of the item-type of the identified object to one or more selected word senses. As an example and not by way of limitation, an object on an online marketplace may have an item-type that represents an item for sale. An object with a shoe item-type (e.g., representing a pair of shoes for sale) may be ranked higher for a query comprising an n-gram with a selected word sense of "shoe" than other objects. Although this disclosure ranking objects in a particular manner, this disclosure contemplates ranking objects in any suitable manner.

In particular embodiments, the social-networking system 160 may send, to the client system in response to the query, a search-results interface for display. The search-results interface may comprise one or more search results corresponding to one or more of the identified objects, respectively. Each identified object may correspond to a search result having a rank greater than a threshold rank. As an example and not by way of limitation, the search results may be sent to the querying user in the form of a list of links on a search-results webpage, where each link is associated with a different webpage that contains some or all of the identified resources or content. As another example and not by way of limitation, client device 130 may be a mobile device and the search results may be sent to the querying user in the form of a list of links via a software application on the mobile device. Each link in the search results may be an internal link, an external link, a hard link, a filename, or any suitable link. In particular embodiments, each link in the search results may be in the form of a Uniform Resource Locator (URL) that specifies where the corresponding webpage is located and the mechanism for retrieving it. The social-networking system 160 may then send the search-results interface to the web browser 132 on the querying user's client system 130. The querying user may then click on the links or otherwise select the content from the search-results interface to access the content from the social-networking system 160 or from an external system (such as, for example, third-party system 170), as appropriate. In particular embodiments, each search result may include a link to a profile interface and a description or summary of the profile interface (or the node corresponding to that profile interface). When generating the search results, the social-networking system 160 may generate and send to the querying user one or more snippets for each search result, where the snippets may include contextual information about the target of the search result (i.e., contextual information about the social-graph entity, profile interface, or other content corresponding to the particular search result). Although this disclosure describes sending a search-results interface in a particular manner, this disclosure contemplates sending a search-results interface in any suitable manner.

Figure 7:
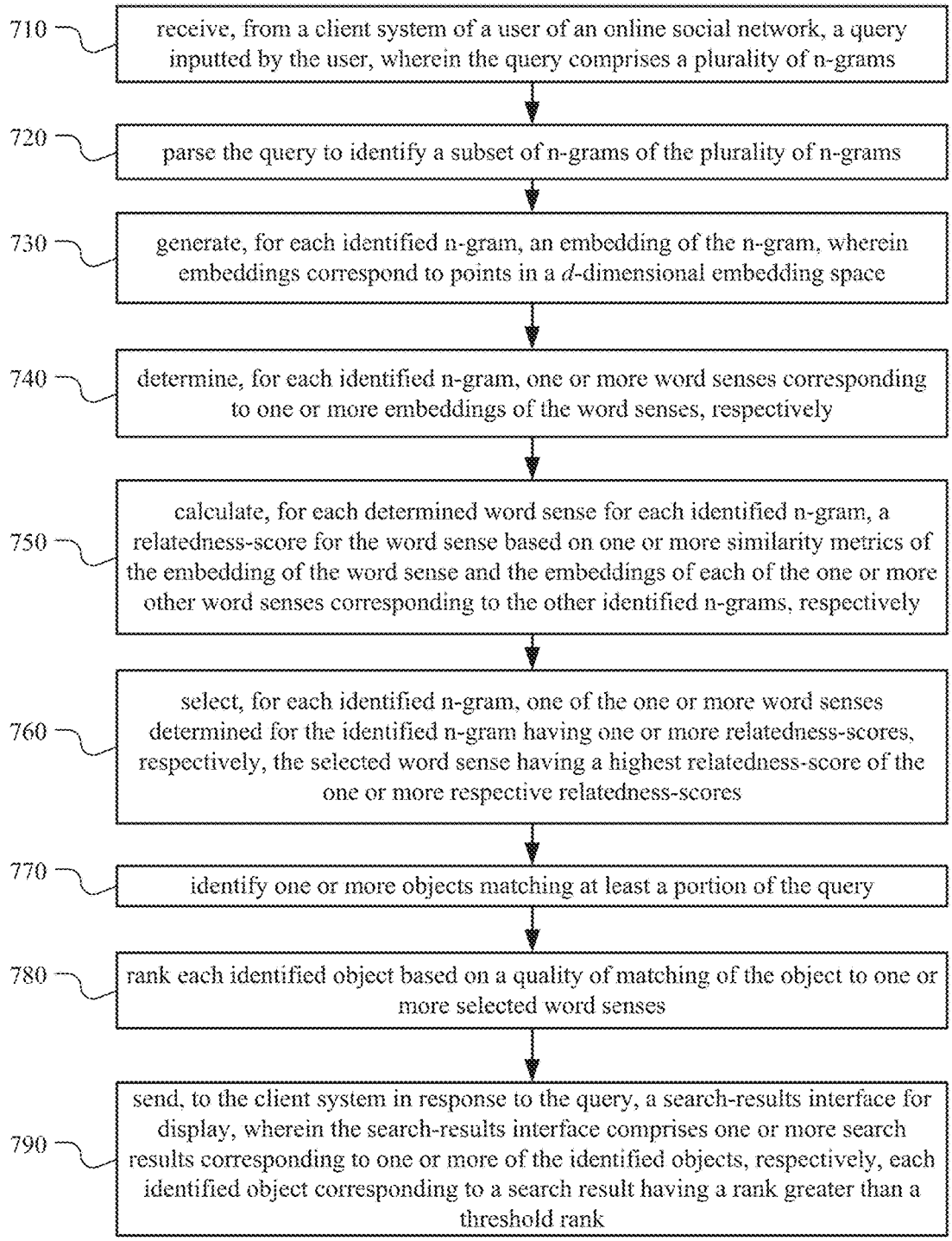
FIG. 7 illustrates an example method for ranking search results based on word senses of a search query.

FIG. 7 illustrates an example method 700 for ranking search results based on word senses of a search query. The method may begin at step 710, where the social-networking system 160 may receive, from a client system of a user of an online social network, a query inputted by the user, wherein the query comprises a plurality of n-grams. At step 720, the social-networking system 160 may parse the query to identify a subset of n-grams of the plurality of n-grams. At step 730, the social-networking system 160 may generate, for each identified n-gram, an embedding of the n-gram, wherein embeddings correspond to points in a d-dimensional embedding space. At step 740, the social-networking system 160 may determine, for each identified n-gram, one or more word senses corresponding to one or more embeddings of the word senses, respectively. At step 750, the social-networking system 160 may calculate, for each determined word sense for each identified n-gram, a relatedness-score for the word sense based on one or more similarity metrics of the embedding of the word sense and the embeddings of each of the one or more other word senses corresponding to the other identified n-grams, respectively. At step 760, the social-networking system 160 may select, for each identified n-gram, one of the one or more word senses determined for the identified n-gram having one or more relatedness-scores, respectively, the selected word sense having a highest relatedness-score of the one or more respective relatedness-scores. At step 770, the social-networking system 160 may identify one or more objects matching at least a portion of the query. At step 780, the social-networking system 160 may rank each identified object based on a quality of matching of the object to one or more selected word senses. At step 790, the social-networking system 160 may send, to the client system in response to the query, a search-results interface for display, wherein the search-results interface comprises one or more search results corresponding to one or more of the identified objects, respectively, each identified object corresponding to a search result having a rank greater than a threshold rank. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for ranking search results based on word senses of the search query including the particular steps of the method of FIG. 7, this disclosure contemplates any suitable method for ranking search results based on word senses of the search query including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Syntactic Models for Parsing Search Queries

In particular embodiments, the social-networking system 160 may determine head-terms and modifier-terms of a query to return relevant search results. A head-term of a phrase may be an n-gram (e.g., a lexical unit) that determines the syntactic type of the phrase and a head-term of a compound may be the stem that determines the semantic category of the compound. The other n-grams of a phrase or compound may be modifier-terms. For example, in the expression "large blue car", the n-gram "car" may be a head-term and the n-grams "large" and "blue" may be modifier-terms. Identifying head-terms and modifier-terms in a phrase (e.g., a word or words that forms a complete grammatical unit) may be done by methods such as deterministic parsing. Users often input search queries that are not grammatical phrases (e.g., by omitting portions such as prepositions, by writing a search query without regard to word order, etc.). As an example and not by way of limitation, the phrases "toys for kids" and "kids with toys" have readily identifiable head-terms and modifier-terms. The query 510 "kids toys", however, has no preposition and may have been intended to mean either "toys for kids" or "kids with toys." To identify head-terms and modifier-terms in such a query, the social-networking system 160 may use a syntactic model. A syntactic model may be, for example, based on a data-structure mapping head-terms to modifier-terms (e.g., a table with one column comprising head-terms and another comprising corresponding modifier-terms). Such a table may be generated by a frequency analysis of a corpus of phrases (i.e., based on a relative frequency of a given head-term modifier-term pair.). As an example and not by way of limitation, by parsing a corpus of phrases, the terms <toys, kids> may be most often used with toys as a head-term and kids as a modifier-term, and this relationship may be used to create an entry in such a table identifying toys as a head-term and kids as a corresponding modifier-term. A syntactic model may also be based on a machine learning model. A machine learning model may be trained using a data structure of head-terms and corresponding modifier-terms, and may output a probability for a pair of n-grams that one n-gram is a head-term and one n-gram is a modifier-term. Identifying head-terms and modifier-terms of a search query may allow more relevant results to be returned to a user. For example, for the query "black basketball shoes", identifying "shoes" as the head-term and returning results that feature shoes may be more relevant that returning, for example, search results related to black basketballs. One technical problem for search engine systems of online social networks may be returning search results that are relevant to a query when there are hundreds of millions, or possibly billions, of objects to search through. When search results that are less relevant to the query are returned to the user, the user may have to execute further queries in an attempt to find more relevant results, burdening the search engine with additional requests, thereby consuming additional computing resources. Embodiments described herein may provide the technical advantage of providing more relevant results based on a head-term of the query of the query, which may, for example, allow fewer search results to be returned, reduce the amount of content that must be delivered, and reduce the time a querying user must spend interacting with a search-results interface to find a relevant search result. This may improve the overall efficiency of the search engine by reducing the amount of computing resources consumed per querying user. Although this disclosure describes parsing a query in a particular manner, this disclosure contemplates parsing a query in any suitable manner.

In particular embodiments, the social-networking system 160 may receive, from a client system 130 of a user of an online social network, a query inputted by the user. The query may comprise a plurality of n-grams. As an example and not by way of limitation, referencing FIG. 5, the querying user may have inputted the query 510 "kids toys". Although this disclosure describes receiving a query in a particular manner, this disclosure contemplates receiving a query in any suitable manner.

Figure 8:
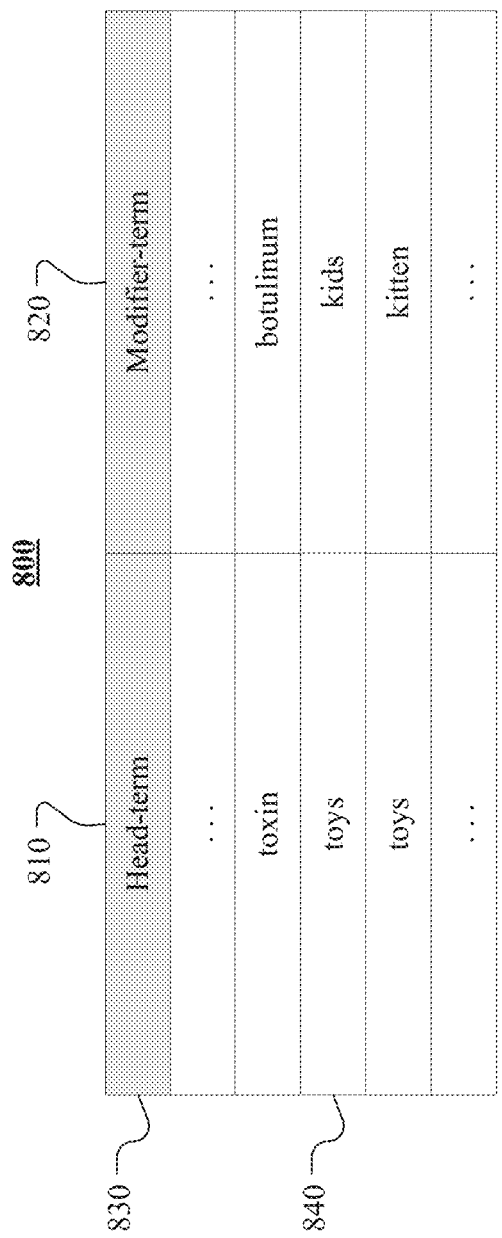
FIG. 8 illustrates an example data structure mapping head-terms to modifier-terms.

FIG. 8 illustrates an example data structure mapping head-terms to modifier-terms. FIG. 8 illustrates the example data structure as a table 800, where row 830 are headers that indicate that column 810 represents head-terms and column 820 represents corresponding modifier-terms. Although the example data structure is illustrated as a table 800, this is for illustrative purposes only, as this disclosure contemplates any suitable data structure. In particular embodiments, the social-networking system 160 may determine one or more head-terms and one or more modifier-terms of the plurality of n-grams based on a syntactic model. In particular embodiments, the syntactic model may comprise a function relating two input terms to an output representing an identification of which of the two input terms is a head-term. The function may be based on a data structure mapping head-terms to modifier-terms, such as the table 800 illustrated in FIG. 8. As an example and not by way of limitation, referencing FIG. 5, the inputted query may be the query 510 "kids toys", and the identified n-grams of the query may be <"kids", "toys">. A function $f(w_1, w_2)$ may return a value indicating whether $w_1$ is a head-term or a modifier-term, and whether $w_2$ is a head-term or a modifier-term based on a data structure (e.g., the function may return 1 if $w_1$ is a head-term and 0 otherwise, the function may return 1 if $w_2$ is a head-term and 0 otherwise, etc.). The social-networking system 160 may evaluate $f(\text{"kids"}, \text{"toys"})$. Referencing FIG. 8, the function $f(\text{"kids"}, \text{"toys"})$ may return a value indicating that "kids" is a modifier-term and "toys" is a head-term based on the row 840, where the n-gram "toys" is in column 810 representing head-terms and the n-gram "kids" is the corresponding n-gram in column 820, representing modifier-terms. In particular embodiments, the function may be generated based on a frequency analysis of a corpus of phrases. As an example and not by way of limitation, table 800 may be generated based on an analysis of a corpus of phrases (e.g., a corpus of novels, websites, news articles, etc.). The corpus may comprise phrases with the n-grams "kids" and "toys", such as "toys for kids", "kids love toys", "kids playing with toys", etc. Each phrase in the corpus may be parsed to determine whether "kids" or "toys" is the head-term of the phrase. For example, in the phrase "toys for kids", "toys" is a head-term and "kids" is a modifier-term. A frequency analysis may comprise determining the frequency with which "toys" is used as a head-term and "kids" is used as a modifier-term, or vice versa. For example, after parsing a corpus of phrases, it may be determined that "kids" is a modifier-term and "toys" is a head-term in 78% of phrases that comprise the n-grams "kids" and "toys", and "kids" is a head-term and "toys" is a modifier-term in 22% of such phrases. Based on the frequency analysis, the data structure may comprise an entry identifying "toys" and a head-term and "kids" as a modifier-term, as that usage was the most frequently used throughout the corpus. Although this disclosure describes determining head-terms and modifier-terms of a query in a particular manner, this disclosure contemplates determining head-terms and modifier-terms of a query in any suitable manner.

In particular embodiments, the syntactic model may comprise a function relating two input terms to an output representing a probability that a first term of the two input terms is a head-term, wherein the function is generated based on a machine learning model. The function may map each input term to an embedding for the input term. As an example and not by way of limitation, referencing FIG. 5, the inputted query may be the query 510 "kids toys" and a function $f(w_1, w_2)=f(\text{"kids"}, \text{"toys"})$ may map to an output representing a probability that "toys" is a head-term and "kids" is a modifier-term, based on embeddings $\vec{\pi}(\text{"kids"})$ and $\vec{\pi}(\text{"toys"})$. If the function output indicates, for example, an 88% probability that "toys" is a head-term, then "toys" may be identified as a head-term and "kids" may be identified as a modifier-term. In particular embodiments, the machine learning model may generate the function based on an analysis of a data structure mapping head-terms to modifier-terms, respectively, where the data structured may be based on a frequency analysis of a corpus of phrases. As an example and not by way of limitation, the machine learning model may be trained using a data structure, such as the table 800 of FIG. 8. Although this disclosure describes determining head-terms and modifier-terms of a query in a particular manner, this disclosure contemplates determining head-terms and modifier-terms of a query in any suitable manner.

In particular embodiments, the social-networking system 160 may identify one or more objects matching at least a portion of the query. As an example and not by way of limitation, in response to the query 510 "kids toys", the social-networking system 160 may identify an object corresponding a toy for children, such as alphabet building blocks (e.g., n-grams of the object may match n-grams of the query). Although this disclosure identifying objects in a particular manner, this disclosure contemplates identifying objects in any suitable manner.

In particular embodiments, the social-networking system 160 may rank each identified object based on a quality of matching of the object to the determined head-terms and modifier-terms. Objects that match head-terms may be ranked higher than those that match modifier-terms. As an example and not by way of limitation, the query may be the query 510 "kids toys", where "toys" may be determined to be a head-term and "toys" may be determined to be a modifier-term. Identified objects that focus on toys (e.g., the n-gram "toys" may appear frequently) may be ranked higher than objects that focus on kids, and objects that focus on both kids and toys may be ranked higher than objects that focus on only one of the terms. In particular embodiments, each identified object may comprise an object-type and ranking each identified object may be further based on a quality of matching of one of the determined head-terms and the object-type of the identified object. As an example and not by way of limitation, if the head-term of a query is a person, then an identified-object that is of a user-type may be ranked higher than objects of another type. In particular embodiments, each identified object may comprise an item-type, and ranking each identified object may be further based on a quality of matching of one of the determined head-terms and the item-type of the identified object. As an example and not by way of limitation, referencing FIG. 5, the query 530 "basketball sneakers" may comprise a head-term "sneakers" and a modifier-term "basketball". An identified object may have an item-type of sneakers, and may be ranked high than objects of other item-types. Although this disclosure describes ranking objects in a particular manner, this disclosure contemplates ranking objects in any suitable manner.

Figure 9:
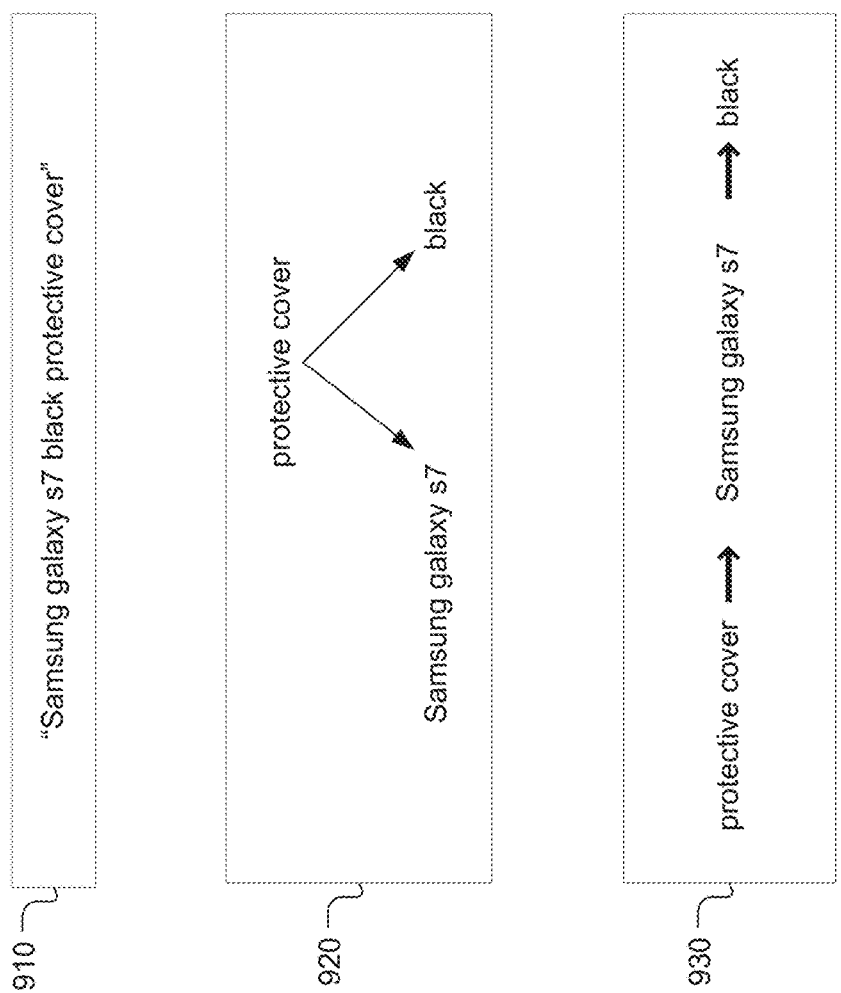
FIG. 9 illustrates an example graphical representation of an example parse tree for an example query.

FIG. 9 illustrates an example graphical representation of an example parse tree for the example query 910 "Samsung galaxy s7 black protective cover". Although FIG. 9 illustrates particular graphical representations of parse trees, this is for illustrative purposes only, as a parse tree may represent data that may be represented graphically according to a variety of conventions. In particular embodiments, the social-networking system 160 may determine a parse tree of the query representing the grammatical structure of the one or more determined head-terms and the one or more determined modifier-terms. A parse tree may represent the grammatical structure of a query according to dependency relationships of the n-grams of the query (e.g., syntactic dependency, semantic dependency, morphological dependency, or prosodic dependency). In particular embodiments, the parse tree may be a syntactic dependency-based parse tree. As an example and not by way of limitation, for the query 910, the identified n-grams of the query may be "Samsung galaxy s7", "black", and "protective cover". The n-gram "protective cover" may be identified as a head-term, and the n-grams "Samsung galaxy s7" and "black" may be identified as modifier-terms. Parse tree 920 is an example parse tree, where the head-term "protective cover" is a root of the tree and dependency edges with arrows from the root to the modifier-terms "Samsung galaxy s7" and "black" may indicate that "Samsung galaxy s7" and "black" are modifying "protective cover". Parse tree 930 is an example parse tree where the head-term "protective cover" is the root with a sequence of modifying relationships stemming from the root, the first modifier-term being "Samsung galaxy s7" and the subsequent modifier-term being "black". Although this disclosure describes determining a parse in a particular manner, this disclosure contemplates determining a parse in any suitable manner.

In particular embodiments, the quality of matching of the object to the determined head-terms and modifier-terms may be further based on a relative position of each head-term and modifier-term in the parse tree with respect to terms associated with the object. As an example and not by way of limitation, referencing FIG. 9, parse tree 930 may be "protective cover"→"Samsung galaxy s7"→"black". Identified objects featuring black protective covers for the Samsung Galaxy s7 may receive the highest rank, followed by protective covers for the Samsung Galaxy s7 in any color, followed by black protective covers, and followed by protective covers for any phone of any color (i.e., the parse tree may determine a priority when ranking, where n-grams closer to the root have a higher priority). As another example and not by way of limitation, the parse tree for the query 510 "kids toys" may be "toys"→"kids", and identified objects featuring toys and kids may be ranked the highest, followed by objects that only feature toys, and followed by objects that only feature kids. Although this disclosure describes ranking objects in a particular manner, this disclosure contemplates ranking objects in any suitable manner.

In particular embodiments, the social-networking system 160 may rewrite the query based on a relative position of each head-term and modifier-term in the parse tree, wherein identifying the one or more objects matching at least the portion of the query may comprise identifying one or more objects matching the rewritten query. As an example and not by way of limitation, the social-networking system 160 may rewrite the query by omitting an n-gram that is not a head-term. Referencing FIG. 9, there may be insufficient results for the query 910 "Samsung galaxy s7 black protective cover". The social-networking system 160 may rewrite the query as "black protective cover", by omitting the modifier-term "Samsung galaxy s7", As another example and not by way of limitation, the social-networking system 160 may rewrite the query by prioritizing head-terms and modifier-terms that are closer to the root of the parse tree. Referencing FIG. 9, for the query 910 "Samsung galaxy s7 black protective cover", the parse tree 930 may be used to prioritize particular n-grams and rewrite the query as "Samsung galaxy s7 protective cover", by omitting the n-gram "black", which is the furthest n-gram from the root head-term "protective cover". Although this disclosure describes rewriting a query in a particular manner, this disclosure contemplates rewriting a query in any suitable manner.

In particular embodiments, the social-networking system 160 may send, to the client system in response to the query, a search-results interface for display. The search-results interface may comprise one or more search results corresponding to one or more of the identified objects, respectively. Each identified object may correspond to a search result having a rank greater than a threshold rank. As an example and not by way of limitation, the search results may be sent to the querying user in the form of a list of links on a search-results webpage, where each link is associated with a different webpage that contains some or all of the identified resources or content. As another example and not by way of limitation, client device 130 may be a mobile device and the search results may be sent to the querying user in the form of a list of links via a software application on the mobile device. Each link in the search results may be an internal link, an external link, a hard link, a filename, or any suitable link. In particular embodiments, each link in the search results may be in the form of a Uniform Resource Locator (URL) that specifies where the corresponding webpage is located and the mechanism for retrieving it. The social-networking system 160 may then send the search-results interface to the web browser 132 on the querying user's client system 130. The querying user may then click on the links or otherwise select the content from the search-results interface to access the content from the social-networking system 160 or from an external system (such as, for example, third-party system 170), as appropriate. In particular embodiments, each search result may include a link to a profile interface and a description or summary of the profile interface (or the node corresponding to that profile interface). When generating the search results, the social-networking system 160 may generate and send to the querying user one or more snippets for each search result, where the snippets may include contextual information about the target of the search result (i.e., contextual information about the social-graph entity, profile interface, or other content corresponding to the particular search result). Although this disclosure describes sending a search-results interface in a particular manner, this disclosure contemplates sending a search-results interface in any suitable manner.

Figure 10:
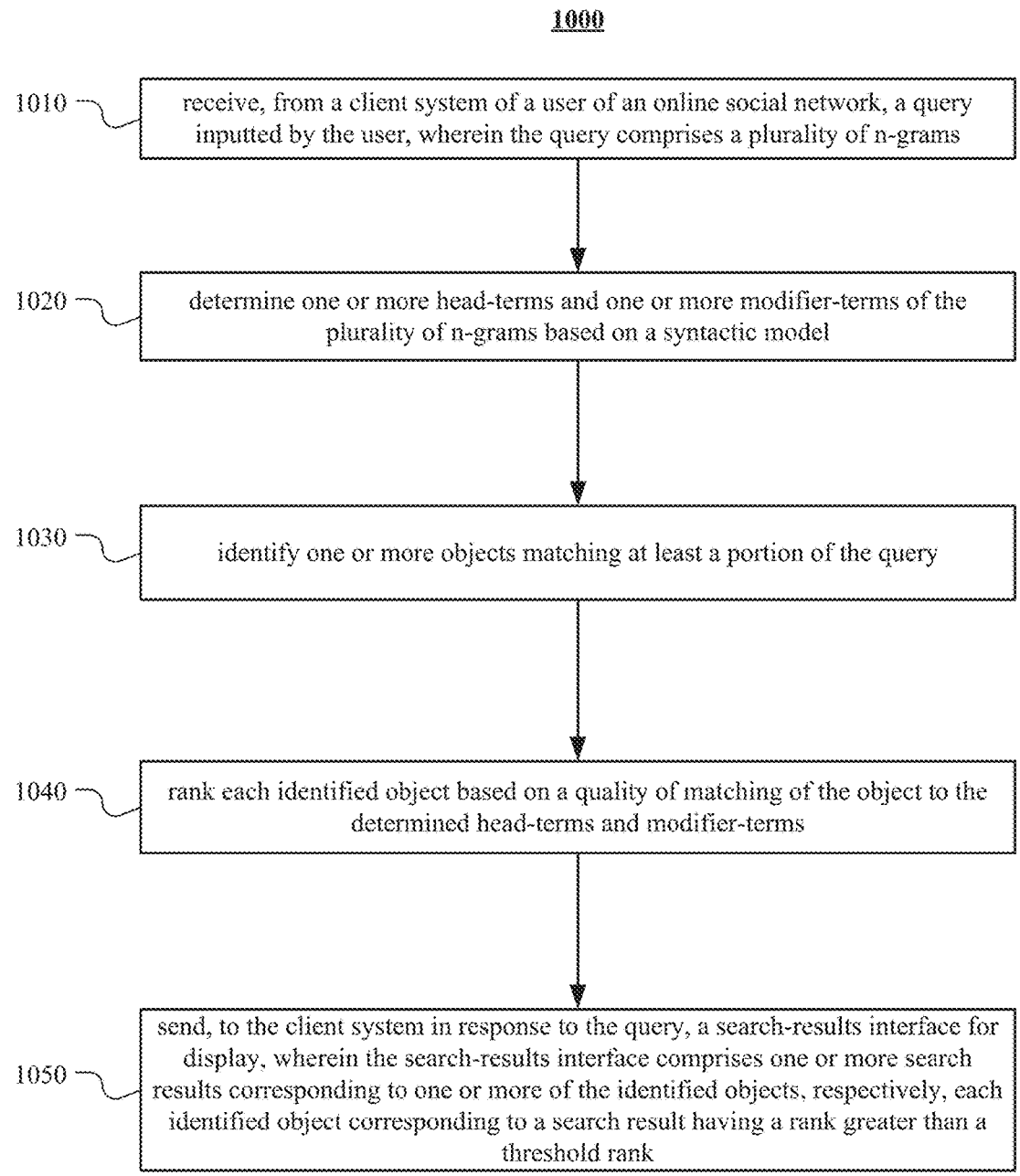
FIG. 10 illustrates an example method for ranking search results based on head-terms and modifier-terms of a query.

FIG. 10 illustrates an example method 1000 for ranking search results based on head-terms and modifier-terms of a query. The method may begin at step 1010, where the social-networking system 160 may receive, from a client system of a user of an online social network, a query inputted by the user, wherein the query comprises a plurality of n-grams. At step 1020, the social-networking system 160 may determine one or more head-terms and one or more modifier-terms of the plurality of n-grams based on a syntactic model. At step 1030, the social-networking system 160 may identify one or more objects matching at least a portion of the query. At step 1040, the social-networking system 160 may rank each identified object based on a quality of matching of the object to the determined head-terms and modifier-terms. At step 1050, the social-networking system 160 may send, to the client system in response to the query, a search-results interface for display, wherein the search-results interface comprises one or more search results corresponding to one or more of the identified objects, respectively, each identified object corresponding to a search result having a rank greater than a threshold rank. Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for ranking search results based on head-terms and modifier-terms of a query including the particular steps of the method of FIG. 10, this disclosure contemplates any suitable method for ranking search results based on head-terms and modifier-terms of a query including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

Systems and Methods

Figure 11:
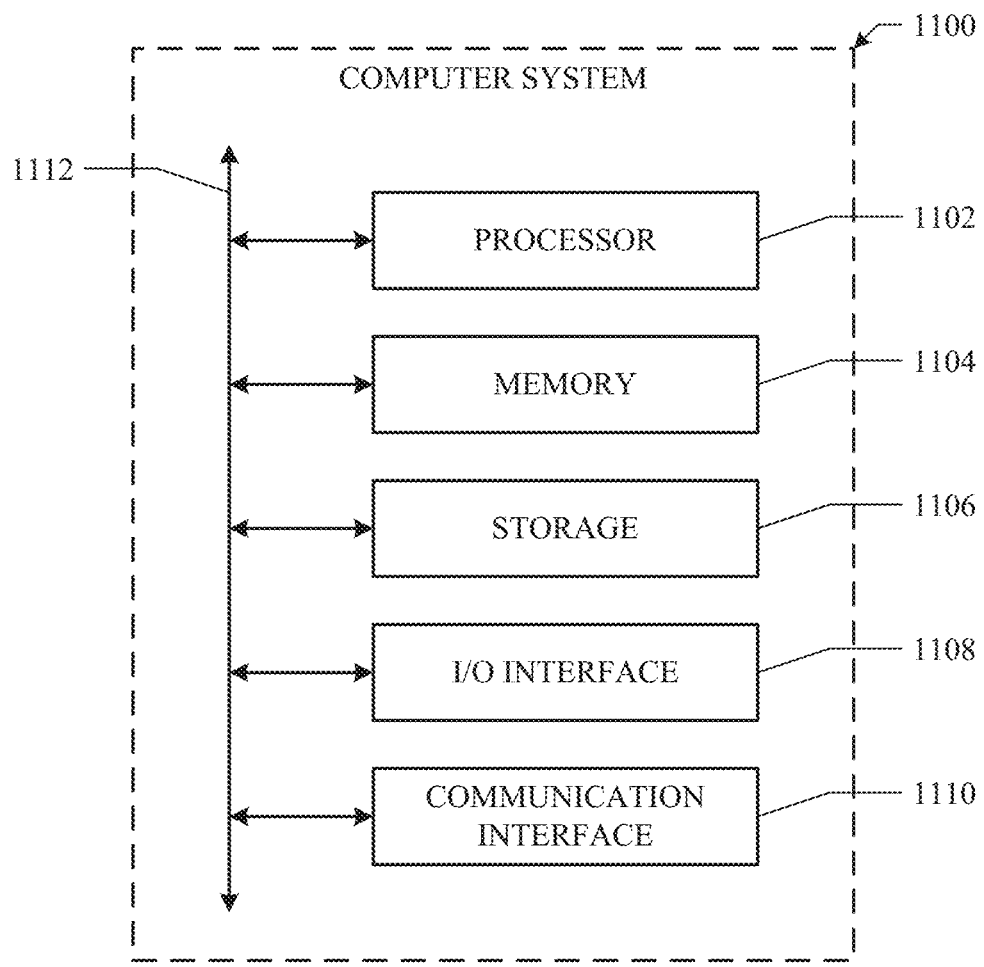
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computer systems:
   receiving, from a client system of a user of an online social network, a query inputted by the user, wherein the query comprises a plurality of n-grams;
   parsing the query to identify a subset of n-grams of the plurality of n-grams;
   generating, for each identified n-gram, an embedding of the n-gram, wherein embeddings correspond to points in a d-dimensional embedding space;
   determining, for each identified n-gram, one or more word senses corresponding to one or more embeddings of the word senses, respectively;
   calculating, for each determined word sense for each identified n-gram, a relatedness-score for the word sense based on one or more similarity metrics of the embedding of the word sense and the embeddings of each of the one or more other word senses corresponding to the other identified n-grams, respectively;
   selecting, for each identified n-gram, one of the one or more word senses determined for the identified n-gram having one or more relatedness-scores, respectively, the selected word sense having a highest relatedness-score of the one or more respective relatedness-scores;
   identifying one or more objects matching at least a portion of the query;
   ranking each identified object based on a quality of matching of the object to one or more selected word senses; and
   sending, to the client system in response to the query, a search-results interface for display, wherein the search-results interface comprises one or more search results corresponding to one or more of the identified objects, respectively, each identified object corresponding to a search result having a rank greater than a threshold rank.

2. The method of claim 1, wherein parsing the query comprises:
   rewriting the query to remove one or more of the plurality of n-grams; and
   identifying the subset of n-grams as the remaining n-grams.

3. The method of claim 1, wherein the one or more similarity metrics are calculated based on one or more cosine similarities of the embedding of the word sense and the embeddings of each of the one or more other word senses corresponding to the other identified n-grams, respectively.

4. The method of claim 1, wherein for each identified n-gram, the one or more word senses are determined based on one or more similarity metrics of the embedding of the n-gram and the embeddings of the one or more word senses, respectively.

5. The method of claim 4, wherein the one or more word senses comprise a specified number of the one or more word senses with the highest similarity metrics of the embedding of the n-gram and the embeddings of the one or more word senses, respectively.

6. The method of claim 4, wherein the one or more word senses comprise each word sense having a similarity metric greater than or equal to a threshold similarity metric of the embedding of the n-gram and the embedding of the word sense.

7. The method of claim 1, wherein at least one of the word senses comprises a plurality of terms, and wherein the embedding of the word sense is an average pooling of embeddings of each term of the plurality of terms.

8. The method of claim 1, wherein calculating the relatedness-score comprises summing an initial-score for the word sense and a context-score for the word sense, and wherein the context-score is a sum of the one or more similarity metrics of the embedding of the word sense and the embeddings of each of the one or more other word senses corresponding to the other identified n-grams, respectively.

9. The method of claim 8, wherein, for each determined word sense for each identified n-gram, the initial-score based on a similarity metric of the embedding of the n-gram and the embedding of the word sense.

10. The method of claim 1, wherein each object is associated with one or more word senses, and wherein each identified object is associated with at least one word sense matching one of the one or more selected word senses.

11. The method of claim 1, wherein each object is associated with one or more topics, and wherein ranking each identified object is further based on a quality of matching of the one or more topics of the identified object to one or more selected word senses.

12. The method of claim 1, wherein each identified object is of a particular object-type, and wherein ranking each identified object is further based on a quality of matching of the object-type of the identified object to one or more selected word senses.

13. The method of claim 1, wherein each identified object is of a particular item-type, and wherein ranking each identified object is further based on a quality of matching of the item-type of the identified object to one or more selected word senses.

14. The method of claim 1, wherein the embeddings are determined based on a machine learning model.

15. The method of claim 1, wherein parsing the query to identify the subset of n-grams of the plurality of n-grams comprises:
   determining a plurality of candidate subsets of n-grams of the plurality of n-grams, wherein each n-gram of each candidate subset of n-grams has at least one corresponding word sense;
   identifying one or more candidate subsets of n-grams with a number of corresponding n-grams less than or equal to each other candidate subset of n-grams; and
   if there is exactly one identified candidate subset of n-grams, then:
      identifying as the subset of n-grams the identified candidate subset of n-grams; and
   if there is a plurality of identified candidate subsets of n-grams, then:
      calculating, for each identified candidate subset of n-grams, a relatedness-score for the identified candidate subset of n-grams based on one or more similarity metrics of an embedding of each n-gram of the identified candidate subset of n-grams and embeddings of each other n-gram of the identified candidate subset of n-grams; and
      identifying as the subset of n-grams an identified candidate subset with a highest relatedness-score.

16. One or more computer-readable non-transitory storage media embodying software that is operable when executed to:

receive, from a client system of a user of an online social network, a query inputted by the user, wherein the query comprises a plurality of n-grams;

parse the query to identify a subset of n-grams of the plurality of n-grams;

generate, for each identified n-gram, an embedding of the n-gram, wherein embeddings correspond to points in a d-dimensional embedding space;

determine, for each identified n-gram, one or more word senses corresponding to one or more embeddings of the word senses, respectively;

calculate, for each determined word sense for each identified n-gram, a relatedness-score for the word sense based on one or more similarity metrics of the embedding of the word sense and the embeddings of each of the one or more other word senses corresponding to the other identified n-grams, respectively;

select, for each identified n-gram, one of the one or more word senses determined for the identified n-gram having one or more relatedness-scores, respectively, the selected word sense having a highest relatedness-score of the one or more respective relatedness-scores;

identify one or more objects matching at least a portion of the query;

rank each identified object based on a quality of matching of the object to one or more selected word senses; and send, to the client system in response to the query, a search-results interface for display, wherein the search-results interface comprises one or more search results corresponding to one or more of the identified objects, respectively, each identified object corresponding to a search result having a rank greater than a threshold rank.

17. The media of claim 16, wherein parsing the query comprises:

rewriting the query to remove one or more of the plurality of n-grams; and identifying the subset of n-grams as the remaining n-grams.

18. The media of claim 16, wherein the one or more similarity metrics are calculated based on one or more cosine similarities of the embedding of the word sense and the embeddings of each of the one or more other word senses corresponding to the other identified n-grams, respectively.

19. The media of claim 16, wherein for each identified n-gram, the one or more word senses are determined based on one or more similarity metrics of the embedding of the n-gram and the embeddings of the one or more word senses, respectively.

20. A system comprising: one or more processors; and a non-transitory memory coupled to the processors comprising instructions executable by the processors, the processors operable when executing the instructions to:

receive, from a client system of a user of an online social network, a query inputted by the user, wherein the query comprises a plurality of n-grams;

parse the query to identify a subset of n-grams of the plurality of n-grams;

generate, for each identified n-gram, an embedding of the n-gram, wherein embeddings correspond to points in a d-dimensional embedding space;

determine, for each identified n-gram, one or more word senses corresponding to one or more embeddings of the word senses, respectively;

calculate, for each determined word sense for each identified n-gram, a relatedness-score for the word sense based on one or more similarity metrics of the embedding of the word sense and the embeddings of each of the one or more other word senses corresponding to the other identified n-grams, respectively;

select, for each identified n-gram, one of the one or more word senses determined for the identified n-gram having one or more relatedness-scores, respectively, the selected word sense having a highest relatedness-score of the one or more respective relatedness-scores;

identify one or more objects matching at least a portion of the query;

rank each identified object based on a quality of matching of the object to one or more selected word senses; and send, to the client system in response to the query, a search-results interface for display, wherein the search-results interface comprises one or more search results corresponding to one or more of the identified objects, respectively, each identified object corresponding to a search result having a rank greater than a threshold rank.

* * * * *